US011520527B1

(12) United States Patent
Alkalay et al.

(10) Patent No.: US 11,520,527 B1
(45) Date of Patent: Dec. 6, 2022

(54) PERSISTENT METADATA STORAGE IN A STORAGE SYSTEM

(71) Applicant: EMC IP Holding Company LLC, Hopkinton, MA (US)

(72) Inventors: Amitai Alkalay, Kadima (IL); Vladimir Shveidel, Pardes-Hana (IL); Lior Kamran, Rishon LeZion (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/345,828

(22) Filed: Jun. 11, 2021

(51) Int. Cl.
*G06F 3/06* (2006.01)
(52) U.S. Cl.
CPC .......... *G06F 3/0659* (2013.01); *G06F 3/0604* (2013.01); *G06F 3/0631* (2013.01); *G06F 3/0644* (2013.01); *G06F 3/0665* (2013.01); *G06F 3/0679* (2013.01)
(58) Field of Classification Search
CPC .... G06F 3/0659; G06F 3/0604; G06F 3/0631; G06F 3/0644; G06F 3/0679; G06F 3/0665
USPC ....................................................... 711/103
See application file for complete search history.

(56) References Cited

U.S. PATENT DOCUMENTS

| 7,165,155 B1 | 1/2007 | Duprey et al. |
| 7,440,982 B2 | 10/2008 | Lu et al. |
| 7,444,464 B2 | 10/2008 | Urmston et al. |
| 8,095,726 B1 | 1/2012 | O'Connell et al. |
| 8,214,612 B1 | 7/2012 | Natanzon |
| 8,301,593 B2 | 10/2012 | Hoffmann et al. |
| 8,335,899 B1 | 12/2012 | Meiri et al. |

(Continued)

FOREIGN PATENT DOCUMENTS

WO 2016111954 A1 7/2016
WO PCT/US2019/024885 1/2020
(Continued)

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Hua J Song
(74) *Attorney, Agent, or Firm* — Ryan, Mason & Lewis, LLP

(57) ABSTRACT

An apparatus comprises a processing device. The processing device is configured to persistently store metadata pages on a plurality of storage devices. The metadata pages are organized into buckets. The processing device is configured to access a given metadata page based at least in part on a bucket identifier where the given metadata page corresponds to a given logical volume. The bucket identifier comprises a first portion comprising an indication of a given bucket range that corresponds to the given logical volume and a second portion comprising an indication of an offset into the given bucket range that corresponds to a grouping of buckets that correspond to the given logical volume. The grouping of buckets corresponds to the given logical volume. The bucket identifier further comprises a third portion comprising an indication of an offset into the grouping of buckets that corresponds to the bucket comprising the given metadata page.

20 Claims, 11 Drawing Sheets

(56) References Cited

U.S. PATENT DOCUMENTS

| | | |
|---|---|---|
| 9,104,326 B2 | 8/2015 | Frank et al. |
| 9,208,162 B1 | 12/2015 | Hallak et al. |
| 9,286,003 B1 | 3/2016 | Hallak et al. |
| 9,514,014 B2 | 12/2016 | Webman et al. |
| 9,552,258 B2 | 1/2017 | Hallak et al. |
| 9,606,870 B1 | 3/2017 | Meiri et al. |
| 9,716,754 B2 | 7/2017 | Swift |
| 9,891,994 B1 | 2/2018 | Schneider et al. |
| 10,176,046 B1 | 1/2019 | Hu et al. |
| 10,261,693 B1 | 4/2019 | Schneider et al. |
| 10,324,640 B1 | 6/2019 | Chen et al. |
| 10,338,851 B1 | 7/2019 | Kronrod et al. |
| 10,359,965 B1 | 7/2019 | Stronge et al. |
| 10,394,485 B1 | 8/2019 | Chen et al. |
| 10,437,501 B1 | 10/2019 | Kucherov et al. |
| 10,437,855 B1 | 10/2019 | Strange et al. |
| 10,466,925 B1 | 11/2019 | Blanco et al. |
| 10,496,324 B2 | 12/2019 | Meiri et al. |
| 10,496,489 B1 | 12/2019 | Chen et al. |
| 10,496,672 B2 | 12/2019 | Meiri et al. |
| 10,558,613 B1 | 2/2020 | Shveidel et al. |
| 10,592,159 B2 | 3/2020 | Kucherov et al. |
| 10,592,161 B1 | 3/2020 | Chen et al. |
| 10,606,519 B1 | 3/2020 | Shveidel |
| 10,635,533 B2 | 4/2020 | Schneider et al. |
| 10,684,915 B2 | 6/2020 | Schneider et al. |
| 10,691,355 B2 | 6/2020 | Kucherov et al. |
| 10,691,373 B2 | 6/2020 | Harduf et al. |
| 10,691,551 B2 | 6/2020 | Meiri et al. |
| 10,698,772 B2 | 6/2020 | Hu et al. |
| 10,705,965 B2 | 7/2020 | Shveidel et al. |
| 10,719,253 B2 | 7/2020 | Alkalay et al. |
| 10,725,855 B2 | 7/2020 | Shani et al. |
| 10,754,559 B1 | 8/2020 | Meiri et al. |
| 10,754,575 B2 | 8/2020 | Stronge |
| 10,754,736 B2 | 8/2020 | Shani et al. |
| 10,761,933 B2 | 9/2020 | Moore et al. |
| 10,783,038 B2 | 9/2020 | Moore et al. |
| 10,817,385 B2 | 10/2020 | Meiri et al. |
| 10,824,512 B2 | 11/2020 | Resnik et al. |
| 10,826,990 B2 | 11/2020 | Kamran et al. |
| 10,831,407 B2 | 11/2020 | Glimcher et al. |
| 10,831,735 B2 | 11/2020 | Schneider et al. |
| 10,838,863 B2 | 11/2020 | Kamran et al. |
| 10,846,178 B2 | 11/2020 | Meiri |
| 10,852,965 B2 | 12/2020 | Glimcher et al. |
| 10,852,974 B2 | 12/2020 | Kucherov et al. |
| 10,852,999 B2 | 12/2020 | Schneider et al. |
| 10,860,234 B2 | 12/2020 | Strange et al. |
| 10,860,241 B2 | 12/2020 | Meiri et al. |
| 10,866,735 B2 | 12/2020 | Meiri et al. |
| 10,866,760 B2 | 12/2020 | Chen et al. |
| 10,866,934 B1 | 12/2020 | Chen et al. |
| 10,866,969 B2 | 12/2020 | Chen et al. |
| 10,871,960 B2 | 12/2020 | Bashi et al. |
| 10,871,991 B2 | 12/2020 | Alkalay et al. |
| 10,884,650 B1 | 1/2021 | Meiri et al. |
| 10,884,651 B2 | 1/2021 | Chen et al. |
| 10,884,799 B2 | 1/2021 | Alkalay et al. |
| 10,891,195 B2 | 1/2021 | Chen |
| 10,901,847 B2 | 1/2021 | Shani et al. |
| 10,909,001 B1 | 2/2021 | Kucherov et al. |
| 10,951,699 B1 | 3/2021 | Sayles et al. |
| 2007/0022121 A1 | 1/2007 | Bahar et al. |
| 2008/0279462 A1 | 11/2008 | Celi, Jr. |
| 2009/0132955 A1 | 5/2009 | Garg et al. |
| 2009/0276593 A1 | 11/2009 | Jacobson et al. |
| 2010/0179941 A1 | 7/2010 | Agrawal et al. |
| 2011/0022566 A1 | 1/2011 | Beaverson et al. |
| 2011/0225123 A1 | 9/2011 | D'Souza et al. |
| 2012/0124282 A1 | 5/2012 | Frank et al. |
| 2013/0305002 A1 | 11/2013 | Hallak et al. |
| 2013/0325824 A1 | 12/2013 | Shoens |
| 2014/0181016 A1 | 6/2014 | Whitehead et al. |
| 2014/0244935 A1 | 8/2014 | Ezra et al. |
| 2015/0378766 A1 | 12/2015 | Beveridge et al. |
| 2015/0378785 A1 | 12/2015 | Tarasuk-Levin et al. |
| 2016/0150012 A1 | 5/2016 | Barszczak et al. |
| 2016/0170987 A1 | 6/2016 | Kesselman |
| 2016/0202927 A1 | 7/2016 | Klarakis et al. |
| 2016/0224259 A1 | 8/2016 | Ahrens et al. |
| 2016/0261513 A1 | 9/2016 | Aingaran et al. |
| 2016/0345207 A1 | 11/2016 | Kwak et al. |
| 2017/0075842 A1 | 3/2017 | Su et al. |
| 2017/0097873 A1* | 4/2017 | Krishnamachari ......................... G06F 11/1474 |
| 2017/0185529 A1 | 6/2017 | Chhabra et al. |
| 2017/0192857 A1 | 7/2017 | Meiri et al. |
| 2018/0095873 A1 | 4/2018 | Nakagoe et al. |
| 2018/0095893 A1* | 4/2018 | Dooley ............... G06F 12/0897 |
| 2019/0303429 A1 | 10/2019 | Chen et al. |
| 2019/0370354 A1 | 12/2019 | Kucherov et al. |
| 2019/0370355 A1 | 12/2019 | Kucherov et al. |
| 2019/0370356 A1 | 12/2019 | Kucherov et al. |
| 2019/0370357 A1 | 12/2019 | Kucherov et al. |
| 2019/0392060 A1 | 12/2019 | Meiri et al. |
| 2020/0026616 A1 | 1/2020 | Hu et al. |
| 2020/0097174 A1 | 3/2020 | Moore et al. |
| 2020/0097363 A1 | 3/2020 | Moore et al. |
| 2020/0097393 A1 | 3/2020 | Moore et al. |
| 2020/0125276 A1 | 4/2020 | Shani et al. |
| 2020/0218601 A1 | 7/2020 | Schneider et al. |
| 2020/0218610 A1 | 7/2020 | Schneider et al. |
| 2020/0225849 A1 | 7/2020 | Meiri et al. |
| 2020/0226023 A1 | 7/2020 | Meiri |
| 2020/0226145 A1 | 7/2020 | Meiri |
| 2020/0233704 A1 | 7/2020 | Alkalay et al. |
| 2020/0233705 A1 | 7/2020 | Alkalay et al. |
| 2020/0233881 A1 | 7/2020 | Harduf et al. |
| 2020/0242130 A1 | 7/2020 | Chen et al. |
| 2020/0249868 A1 | 8/2020 | Glimcher et al. |
| 2020/0249869 A1 | 8/2020 | Glimcher et al. |
| 2020/0250089 A1 | 8/2020 | Kamran et al. |
| 2020/0250144 A1 | 8/2020 | Natanzon et al. |
| 2020/0272542 A1 | 8/2020 | Meiri et al. |
| 2020/0272600 A1 | 8/2020 | Natanzon et al. |
| 2020/0285268 A1 | 9/2020 | Meiri et al. |
| 2020/0285402 A1 | 9/2020 | Meiri et al. |
| 2020/0301784 A1 | 9/2020 | Chen |
| 2020/0310649 A1 | 10/2020 | Chen et al. |
| 2020/0310654 A1 | 10/2020 | Meiri et al. |
| 2020/0326877 A1 | 10/2020 | Chen et al. |
| 2020/0327024 A1 | 10/2020 | Alkalay et al. |
| 2020/0341641 A1 | 10/2020 | Kucherov et al. |
| 2020/0341682 A1 | 10/2020 | Kucherov et al. |
| 2020/0341749 A1 | 10/2020 | Bashi et al. |
| 2020/0364106 A1 | 11/2020 | Chen et al. |
| 2020/0401314 A1 | 12/2020 | Chen et al. |
| 2020/0401315 A1 | 12/2020 | Chen et al. |
| 2021/0019229 A1 | 1/2021 | Kucherov et al. |
| 2021/0034267 A1 | 2/2021 | Kucherov et al. |
| 2021/0034543 A1 | 2/2021 | Shveidel et al. |
| 2021/0124494 A1 | 4/2021 | Chen et al. |
| 2021/0124657 A1 | 4/2021 | Kamran et al. |
| 2021/0132839 A1 | 5/2021 | Kamran et al. |
| 2021/0157695 A1 | 5/2021 | Tai |

FOREIGN PATENT DOCUMENTS

| | | |
|---|---|---|
| WO | PCT/US2019/024900 | 1/2020 |
| WO | 2020204880 A1 | 10/2020 |
| WO | 2020204882 A1 | 10/2020 |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Protection (XDP): Flash-Specific Data Protection, Provided by XtremIO (Ver. 4.0)," White Paper, Apr. 2015, 25 pages.

(56) References Cited

OTHER PUBLICATIONS

DELL EMC, "XtremIO v6.0 Specifications," Specification Sheet, 2017, 4 pages.
DELL EMC, "Dell EMC XtremIO X2: Next-Generation All-Flash Array," Data Sheet, 2017, 5 pages.
EMC Corporation, "High Availability, Data Protection and Data Integrity in the XtremIO Architecture," White Paper, Apr. 2015, 28 pages.
DELL EMC, "Introduction to Dell EMC XtremIO X2 Storage Array—A Detailed Review," Dell EMC White Paper, Aug. 2017, 46 pages.
N. Tolia et al., "Opportunistic Use of Content Addressable Storage for Distributed File Systems," Proceedings of the USENIX Annual Technical Conference, Jun. 9-14, 2003, 14 pages.
EMC Corporation, "EMC Recoverpoint Replication of XtremIO: Understanding the Essentials of RecoverPoint Snap-Based Replication for XtremIO," EMC White Paper, Aug. 2015, 31 pages.
DELL EMC, "Introduction to Dell EMC XtremIO X2 Storage Array—A Detailed Review," Dell EMC White Paper, Apr. 2018, 52 pages.
DELL EMC, "Introduction to XtremIO Metadata-Aware Replication," Dell EMC White Paper, Apr. 2018, 18 pages.
DELL EMC, "PowerMax OS," Dell EMC PowerMax Family Product Guide, May 2019, 192 pages.
DELL EMC, "Dell EMC VxRack FLEX," Dell EMC Product Overview, 2018, 5 pages.
NVM Express, "NVM Express, Revision 1.3," NVM Express, May 1, 2017, 282 pages.

\* cited by examiner

PERSISTENT METADATA STORAGE IN A STORAGE SYSTEM

FIELD

The field relates generally to information processing systems, and more particularly to storage in information processing systems.

BACKGROUND

A wide variety of different types of distributed storage systems are known. Such storage systems include clustered storage systems as well as other types of storage systems that are distributed across multiple storage nodes. Distributed storage systems can include a potentially large number of distributed storage nodes that are interconnected by a mesh network or other type of communication network. Each such storage node of a distributed storage system typically processes input-output (IO) operations from one or more host devices. During the processing of those IO operations, the storage node runs various storage application processes. The storage application processes in some cases handle the persistent storage of metadata pages on storage devices of the storage system. However, as the number of logical volumes that are utilized in a storage system increases, the amount of memory and processing resources needed to support the corresponding metadata pages also increases. Also, the resource requirements for processing a larger allocation of memory to the persistent storage of metadata pages can adversely impact the performance of the storage system.

SUMMARY

Illustrative embodiments provide techniques for metadata storage that overcome drawbacks of conventional arrangements. For example, some embodiments provide metadata storage using a dynamic pool that provides a more balanced memory allocation in a distributed storage system.

In one embodiment, an apparatus comprises a storage system comprising a plurality of storage devices and at least one processing device comprising a processor coupled to a memory. The at least one processing device is configured to persistently store a plurality of metadata pages of the storage system on the plurality of storage devices. The metadata pages are organized into a plurality of buckets. The at least one processing device is further configured to access a given metadata page of the plurality of metadata pages based at least in part on a bucket identifier. The given metadata page corresponds to a given logical volume of a plurality of logical volumes of the storage system. The bucket identifier comprises a first portion comprising an indication of a given bucket range of a plurality of bucket ranges that corresponds to the given logical volume, a second portion comprising an indication of an offset into the given bucket range that corresponds to a first grouping of buckets that correspond to the given logical volume and a third portion comprising an indication of an offset into the first grouping of buckets that corresponds to the bucket comprising the given metadata page.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
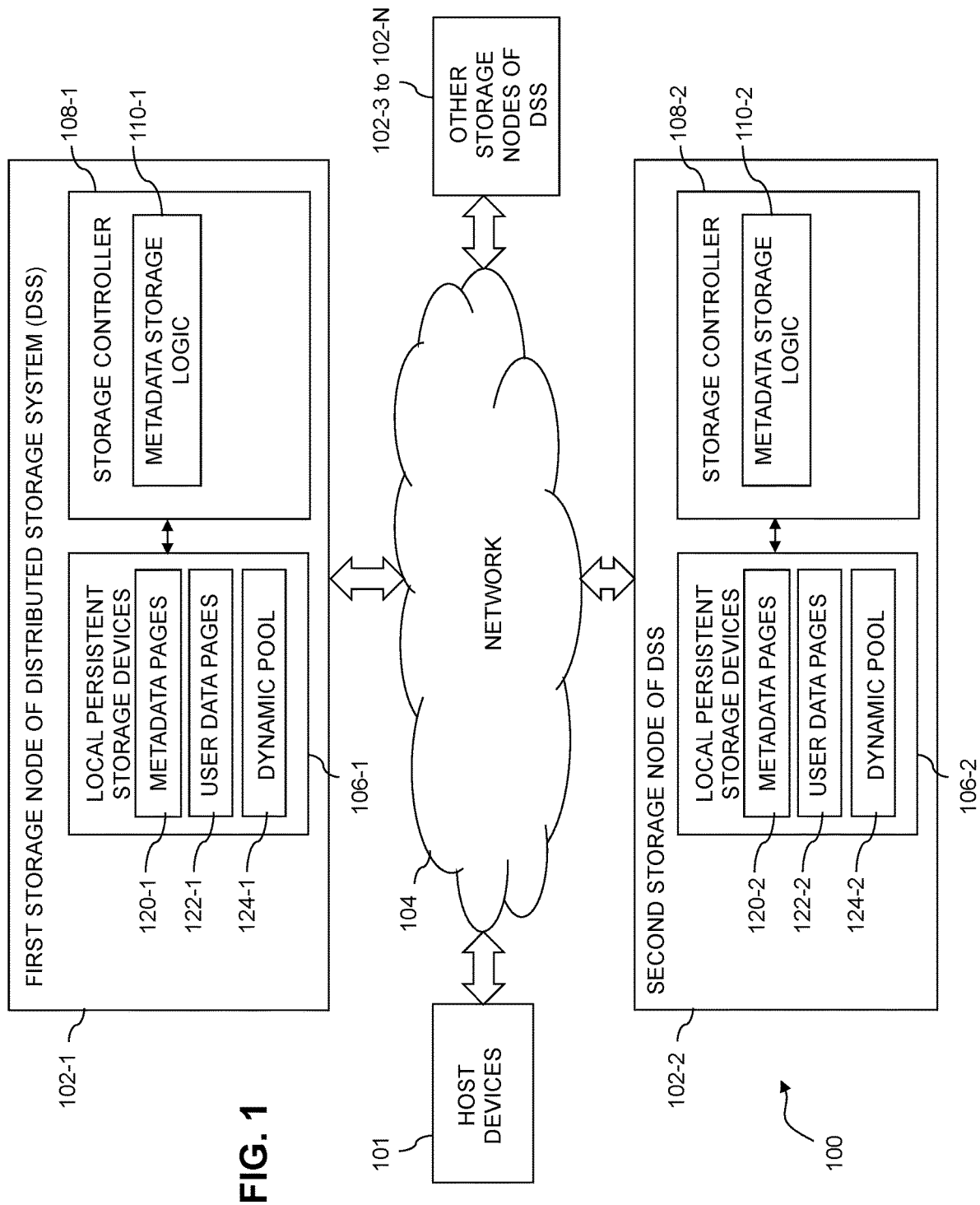
FIG. 1 is a block diagram of an information processing system comprising a distributed storage system incorporating functionality for metadata storage in an illustrative embodiment.

FIG. 1 shows an information processing system 100 configured in accordance with an illustrative embodiment. The information processing system 100 comprises a plurality of host devices 101, a first storage node 102-1, a second storage node 102-2, and a plurality of additional storage nodes 102-3 through 102-N, collectively and individually referred to herein as storage node(s) 102, all of which are configured to communicate with one another over a network 104. The first and second storage nodes 102 with the additional storage nodes 102-3 through 102-N collectively form an example of what is more generally referred to herein as a "distributed storage system" or DSS. Other distributed storage systems can include different numbers and arrangements of storage nodes. For example, a distributed storage system in some embodiments may include only the first and second storage nodes 102.

Each of the storage nodes 102 is illustratively configured to interact with one or more of the host devices 101. The host devices 101 illustratively comprise servers or other types of computers of an enterprise computer system, cloud-based computer system or other arrangement of multiple compute nodes associated with respective users.

The host devices 101 in some embodiments illustratively provide compute services such as execution of one or more applications on behalf of each of one or more users associated with respective ones of the host devices 101. Such applications illustratively generate input-output (IO) operations that are processed by a corresponding one of the storage nodes 102. The term "input-output" as used herein refers to at least one of input and output. For example, IO operations may comprise write requests and/or read requests directed to logical addresses of a particular logical storage volume of a given one of the storage nodes 102. These and other types of IO operations are also generally referred to herein as IO requests.

The storage nodes 102 illustratively comprise respective processing devices of one or more processing platforms. For example, the storage nodes 102 can each comprise one or more processing devices each having a processor and a memory, possibly implementing virtual machines and/or containers, although numerous other configurations are possible.

The storage nodes 102 can additionally or alternatively be part of cloud infrastructure such as an Amazon Web Services (AWS) system. Other examples of cloud-based systems that can be used to provide at least portions of the storage nodes 102 include Google Cloud Platform (GCP) and Microsoft Azure.

The storage nodes 102 may be implemented on a common processing platform, or on separate processing platforms.

The host devices 101 are illustratively configured to write data to and read data from the distributed storage system comprising storage nodes 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The first storage node 102-1 comprises a plurality of storage devices 106-1 and an associated storage controller 108-1. The storage devices 106-1 store metadata pages 120-1 and user data pages 122-1 that are associated with one or more logical storage volumes of the distributed storage system. The logical storage volumes illustratively comprise respective logical units (LUNs) or other types of logical storage volumes. The storage devices 106-1 also have a portion of non-static memory allocated as a dynamic pool 124-1. The memory of the dynamic pool 124-1 is allocated and deallocated by the storage controller 108-1 for various uses by the storage system. The storage devices 106-1 more particularly comprise local persistent storage devices of the first storage node 102-1. Such persistent storage devices are local to the first storage node 102-1, but remote from the second storage node 102-2 and the other storage nodes 102.

Similarly, the second storage node 102-2 comprises a plurality of storage devices 106-2 and an associated storage controller 108-2. The storage devices 106-2 store metadata pages 120-2 and user data pages 122-2 that are associated with one or more logical storage volumes of the distributed storage system, such as the above-noted LUNs. The storage devices 106-2 also have a portion of non-static memory allocated as a dynamic pool 124-2. The memory of the dynamic pool 124-2 is allocated and deallocated by the storage controller 108-1 for various uses by the storage system. The storage devices 106-2 more particularly comprise local persistent storage devices of the second storage node 102-2. Such persistent storage devices are local to the second storage node 102-2, but remote from the first storage node 102-1 and the other storage nodes 102.

The storage controller 108-1 of first storage node 102-1 in the FIG. 1 embodiment includes metadata storage logic 110-1. It can also include additional elements, such as a signature generator for generating content-based signatures of respective data pages.

Similarly, the storage controller 108-2 of second storage node 102-2 includes metadata storage logic 110-2. The storage controller 108-2, like the storage controller 108-1, can also include additional elements, such as a signature generator for generating content-based signatures of respective data pages. The storage controller 108-1 and the storage controller 108-2 may also be collectively or individually referred to herein as storage controller(s) 108.

The storage controllers 108 of the storage nodes 102 control the interactions of the storage nodes 102 with local and remote storage devices 106 of the distributed storage system. The local persistent storage of a given one of the storage nodes 102 illustratively comprises the particular local persistent storage devices that are implemented in or otherwise associated with that storage node. It is assumed that such local persistent storage devices of the given storage node are accessible to the storage controller 108 of that storage node 102 via a local interface, and are accessible to storage controllers 108 of respective other ones of the storage nodes 102 via remote interfaces. The storage controllers 108 illustratively control the manner in which the local and remote interfaces are used to access persistent storage of the given node.

For example, each of the storage devices 106 on a given one of the storage nodes 102 can be accessed by the given storage node 102 via its local interface, or by any of the other storage nodes via a remote direct memory access (RDMA) interface. A given storage application executing on the storage nodes 102 illustratively requires that all of the storage nodes 102 be able to access all of the storage devices 106. Such access to local persistent storage of each node from the other storage nodes can be performed, for example, using the RDMA interfaces with the other storage nodes, although other arrangements are possible.

The dynamic pools 124-1 and 124-2 and corresponding dynamic pools of the storage nodes 102-3 to 102-N are collectively or individually referred to herein as dynamic pool(s) 124. In some embodiments, while illustrated and described as separate dynamic pools 124, the dynamic pools 124 of the various storage nodes 102 may alternatively be logically considered a single dynamic pool 124 to which all of the storage nodes 102 have access.

The instances of metadata storage logic 110-1 and 110-2 are collectively or individually referred to herein as metadata storage logic 110. Such metadata storage logic instances are illustratively configured to control performance of at least portions of processes described herein for storing metadata pages in persistent storage on the storage devices 106.

Each of the other storage nodes 102 of the distributed storage system of FIG. 1 is assumed to be configured in a manner similar to that described above for the first storage node 102-1 and the second storage node 102-2.

The storage controllers 108 of the storage nodes 102 may include additional modules and other components typically found in conventional implementations of storage controllers and storage systems, although such additional modules and other components are omitted from the figure for clarity and simplicity of illustration.

For example, the storage controllers 108 can comprise or be otherwise associated with a write cache and a write cache journal, both also illustratively distributed across the storage nodes 102 of the distributed storage system. One or more additional journals may also be provided such as, e.g., a metadata update journal. Illustrative embodiments disclosed herein provide efficient techniques for storing metadata pages persistently in the storage devices using metadata storage functionality implemented in the storage nodes 102.

The storage devices 106 of the storage nodes 102 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices. Such storage devices are examples of local persistent storage devices 106 of the storage nodes 102 of the distributed storage system of FIG. 1.

In some embodiments, the storage nodes 102 of the distributed storage system collectively provide a scale-out all-flash content addressable storage array. The storage nodes 102 can be used to implement other types of storage systems in other embodiments. One or more such storage nodes can be associated with at least one storage array. Additional or alternative types of storage products that can be used in implementing a given storage system in illustrative embodiments include software-defined storage, cloud storage, object-based storage and scale-out storage. Combinations of multiple ones of these and other storage types can also be used.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the host devices 101 and the storage nodes 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage nodes 102 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The persistent storage illustratively comprises sets of persistent storage devices 106 associated with respective ones of the storage nodes 102. Some of the storage devices 106 are in the set of local persistent storage devices 106-1 associated with the first storage node 102-1, while others are in one or more other sets of local persistent storage devices 106 associated with respective other ones of the storage nodes 102.

A given set of local persistent storage devices 106 on a given one of the storage nodes 102 is illustratively implemented in a disk array enclosure (DAE) or other type of storage array enclosure of that storage node.

An address-to-hash (A2H) table provides mapping between logical block addresses (LBAs) and hashes of respective user data pages. The A2H table is illustratively backed up in persistent storage as a set of hash-based backup (HBBKUP) pages, each 16 KB in size, although other page types and page sizes can be used in other embodiments. A given HBBKUP page contains a plurality of LBA-hash pairs, each such pair providing a mapping between a particular LBA and a hash of the corresponding data page. The HBBKUP pages are examples of what are more generally referred to herein as "metadata pages." The HBBKUP pages are illustratively organized in buckets, where each such bucket contains a plurality of HBBKUP pages. A given HBBKUP page can therefore be uniquely identified by a pair comprising a bucket identifier (ID) and a page index of that HBBKUP page within the bucket having the bucket ID.

In some embodiments, the LBA-hash pairs are arranged into buckets using an arithmetic function or other type of function based at least in part on the LBA. For example, techniques such as those disclosed in U.S. patent application Ser. No. 16/526,641, filed Jul. 30, 2019, now U.S. Pat. No. 11,163,693, and entitled "Hash-Based One-Level Mapping for Storage Clusters," which is incorporated by reference herein in its entirety, can be used in illustrative embodiments to assign LBA-hash pairs to buckets. Other assignment techniques can be used in other embodiments disclosed herein.

It should be noted that the address-to-hash mappings inside a physical page of the distributed storage system in some embodiments need not be indexed in any way, since it is typically not necessary to locate a specific entry. These pages are illustratively used as backup, and possibly only during a loading phase, such as when the system is initialized or recovering from failure events, and not during normal operation. When these pages are loaded, all mappings in a given bucket are typically processed in order to update them into memory, and as a result there may be no need to locate a specific entry.

The storage nodes 102 collectively comprise an example of a distributed storage system. The term "distributed storage system" as used herein is intended to be broadly construed, so as to encompass, for example, clustered storage systems or other types of storage systems distributed over multiple storage nodes. A given such storage node can comprise a set of processing modules configured to communicate with corresponding sets of processing modules on other ones of the storage nodes. The sets of processing modules of the storage nodes collectively comprise a distributed storage controller of the distributed storage system.

The storage nodes 102 in some embodiments are part of a distributed content addressable storage system in which logical addresses of data pages are mapped to physical addresses of the data pages in the storage devices 106 using respective content-based signatures that are generated from those data pages, as will now be described in more detail with reference to the illustrative embodiments of FIGS. 2 and 3.

Figure 2:
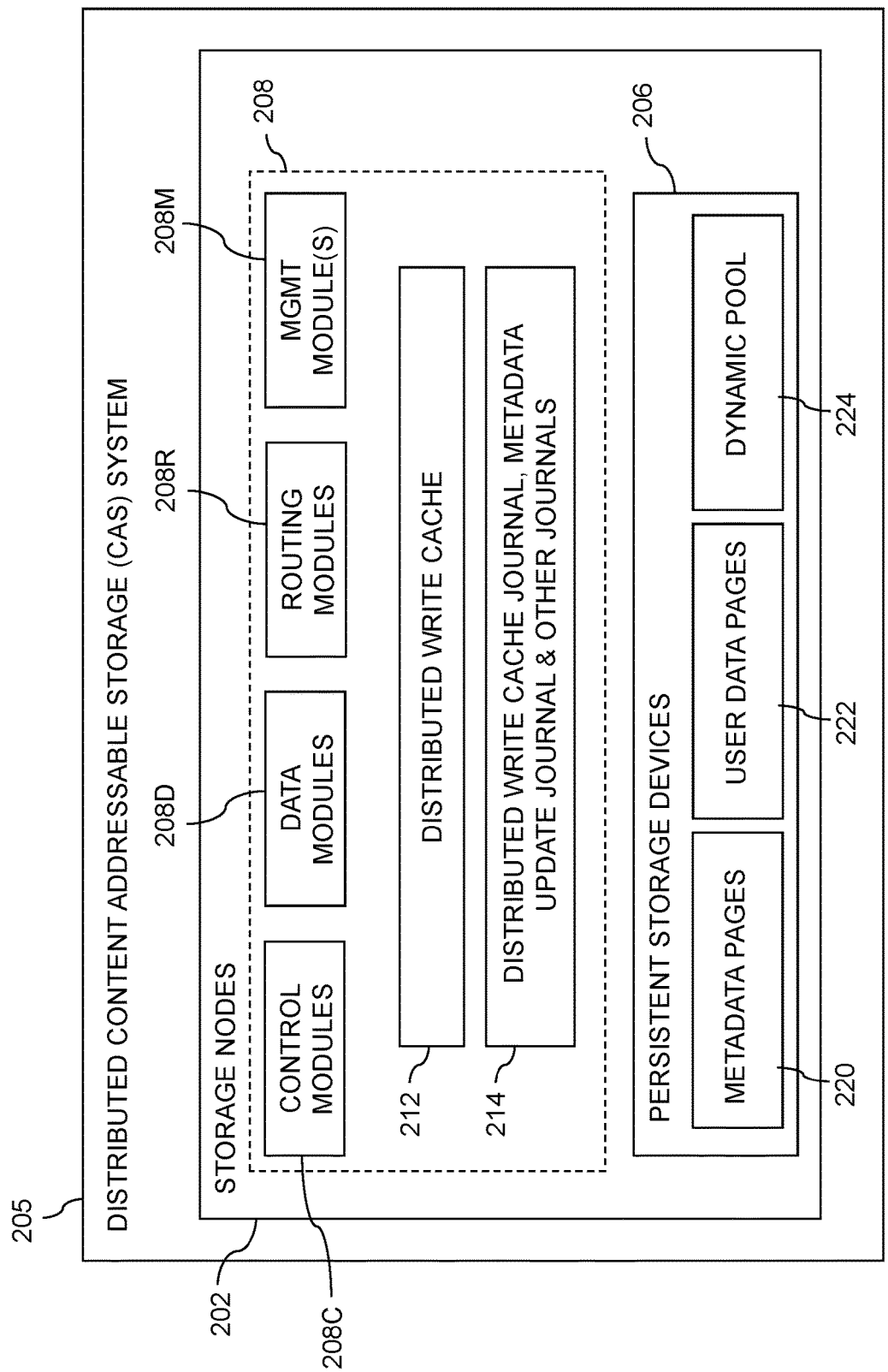
FIG. 2 shows an example of a distributed content addressable storage (CAS) system that illustratively represents one possible implementation of a distributed storage system in some embodiments.

FIG. 2 shows an example of a distributed content addressable storage (CAS) system 205 that illustratively represents a particular example implementation of the distributed storage system comprising the storage nodes 102 of FIG. 1. The distributed CAS system 205 is therefore assumed to be coupled to one or more host devices 101 of a computer system within information processing system 100.

The CAS system 205 comprises a plurality of storage devices 206 and an associated storage controller 208. The storage devices 206 store data of a plurality of logical storage volumes. The logical storage volumes illustratively comprise respective LUNs or other types of logical storage volumes. The stored data comprises metadata pages 220 and user data pages 222, both described in more detail elsewhere herein. The storage devices 206 also comprise a dynamic pool 224 similar to dynamic pool 124. The storage devices 206 and storage controller 208 are distributed across multiple storage nodes 202. The CAS system 205 can include additional components, such as metadata storage logic, also illustratively distributed across the storage nodes 202 of the CAS system 205.

The CAS system 205 is illustratively implemented as a distributed storage system, also referred to herein as a clustered storage system, in which each of at least a subset of the storage nodes 202 comprises a set of processing modules configured to communicate with corresponding sets of processing modules on other ones of the storage nodes 202. The sets of processing modules of the storage nodes of the CAS system 205 collectively comprise at least a portion of the storage controller 208 of the CAS system 205. For example, in some embodiments the sets of processing modules of the storage nodes collectively comprise a distributed storage controller of the CAS system 205. A "distributed storage system" as that term is broadly used herein is intended to encompass any storage system that, like the CAS system 205, is distributed across multiple storage nodes.

Although it is assumed that both the first storage node 102-1 and the second storage node 102-2 are part of a single content addressable storage system in some embodiments, other types of storage systems can be used for one or both of the first storage node 102-1 and the second storage node 102-2 in other embodiments. For example, it is possible that at least one of the storage nodes 102 in an illustrative embodiment need not be a content addressable storage system and need not include an ability to generate content-based signatures. In an embodiment of this type, the signature generation functionality can be implemented in a host device.

The storage controller 208 in the present embodiment is configured to implement metadata storage functionality for persistently storage metadata pages as will be described in more detail below in conjunction with FIG. 1.

The storage controller 208 includes a distributed write cache 212 and a set of distributed journals 214. The set of distributed journals 214 illustratively comprises a write cache journal, a metadata update journal and possibly one or more other journals. The distributed write cache 212 and the set of distributed journals 214 each illustratively have respective instances thereof on each of the storage nodes 202.

Additional modules that are assumed to be implemented in the storage controller 208 but are not explicitly shown in the figure include, for example, distributed instances of metadata storage logic 110, with different instances thereof being implemented on the storage nodes 202. Each of the storage nodes 202 of the CAS system 205 is assumed to be implemented using at least one processing device comprising a processor coupled to a memory.

In the CAS system 205, logical addresses of data pages are mapped to physical addresses of the data pages using respective content-based signatures that are generated from those data pages. The data pages illustratively include user data pages 222. Metadata pages 220 are typically handled in a different manner, as will be described.

The term "page" as used in this and other contexts herein is intended to be broadly construed so as to encompass any of a wide variety of different types of blocks that may be utilized in a block storage device of a storage system. Different native page sizes are generally utilized in different storage systems of different types. For example, one type of storage array may utilize a native page size of 8 kilobytes (KB), while another type of storage array may utilize a native page size of 16 KB. Larger native page sizes of 64 KB and 128 KB are utilized in yet other storage arrays. The native page size generally refers to a typical page size at which the storage system ordinarily operates, although it is possible that some storage systems may support multiple distinct page sizes as a configurable parameter of the system. Each such page size of a given storage system may be considered a "native page size" of the storage system as that term is broadly used herein.

A given "page" as the term is broadly used herein should therefore not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing data pages of the CAS system 205.

Also, the terms "storage volume" and "logical storage volume" as used herein are intended to be broadly construed, and should not be viewed as being limited to any particular format or configuration.

The content-based signatures utilized in some embodiments illustratively comprise respective hash digests of respective data pages of a storage volume. A given one of the hash digests is generated in illustrative embodiments by applying a secure hashing algorithm to content of a corresponding one of the data pages of the storage volume. For example, a given hash digest can be generated by application of a hash function such as the well-known Secure Hashing Algorithm 1 (SHA1) to the content of its corresponding data page. Other types of secure hashing algorithms, such as SHA2 or SHA256, or more generally other hash functions, can be used in generating content-based signatures herein.

A given hash digest in illustrative embodiments is unique to the particular content of the page from which it is generated, such that two pages with exactly the same content will have the same hash digest, while two pages with different content will have different hash digests. It is also possible that other types of content-based signatures may be used, such as hash handles of the type described elsewhere herein. A hash handle generally provides a shortened representation of its corresponding hash digest. More particularly, the hash handles are shorter in length than respective hash digests that are generated by applying a secure hashing algorithm to respective ones of the data pages. Hash handles are considered examples of "content-based signatures" as that term is broadly used herein.

As indicated above, the storage controller 208 in this embodiment is implemented as a distributed storage controller that comprises sets of processing modules distributed over the storage nodes 202. The storage controller 208 is therefore an example of what is more generally referred to herein as a distributed storage controller.

It is assumed in some embodiments that the processing modules of the storage controller 208 are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of the storage controller 208 illustratively comprise control modules 208C, data modules 208D, routing modules 208R and at least one management module 208M. Again, these and possibly other processing modules of the storage controller 208 are illustratively interconnected with one another in the full mesh network, such that each of the modules can communicate with each of the other modules, although other types of networks and different module interconnection arrangements can be used in other embodiments.

The management module 208M of the distributed storage controller in this embodiment may more particularly comprise a system-wide management module, also referred to herein as a system manager. Other embodiments can include multiple instances of the management module 208M implemented on different ones of the storage nodes 202. It is therefore assumed that the storage controller 208 comprises one or more management modules 208M.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

The processing modules of the storage controller 208 as disclosed herein utilize metadata structures that include logical layer and physical layer mapping tables to be described below. It is to be appreciated that these particular tables are only examples, and other tables or metadata structures having different configurations of entries and fields can be used in other embodiments. The logical layer and physical layer mapping tables in this embodiment illustratively include the following:

1. An A2H table. The A2H table illustratively comprises a plurality of entries accessible utilizing logical addresses as respective keys, with each such entry of the A2H table comprising a corresponding one of the logical addresses, a corresponding one of the hash handles, and possibly one or more additional fields. In some embodiments, the A2H table is assumed to comprise full hash digests in place of or in addition to hash handles. Other configurations are possible, and the term "address-to-hash table" as used herein is therefore intended to be broadly construed.

2. A hash-to-data (H2D) table. The H2D table illustratively comprises a plurality of entries accessible utilizing hash handles as respective keys, with each such entry of the H2D table comprising a corresponding one of the hash handles, a physical offset of a corresponding one of the data pages, and possibly one or more additional fields. Again, full hash digests can be used in place of or in addition to hash handles.

3. A hash metadata (HMD) table. The HMD table illustratively comprises a plurality of entries accessible utilizing hash handles as respective keys. Each such entry of the HMD table comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. The HMD table illustratively comprises at least a portion of the same information that is found in the H2D table. Accordingly, in other embodiments, those two tables can be combined into a single table, illustratively referred to as an H2D table, an HMD table or another type of physical layer mapping table providing a mapping between hash values, such as hash handles or hash digests, and corresponding physical addresses of data pages.

4. A physical layer based (PLB) table. The PLB table illustratively comprises a plurality of entries accessible utilizing physical offsets as respective keys, with each such entry of the PLB table comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length. Hash digests can be used in place of in addition to hash handles in some embodiments.

Again, the logical layer and physical layer mapping tables referred to above are examples only, and can be varied in other embodiments. For example, other types of hash-to-physical (H2P) mapping tables may be used in addition to or in place of the above-noted H2D, HMD and/or PLB tables.

In some embodiments, certain ones of the above-described mapping tables are maintained by particular modules of storage controller 208. For example, the mapping tables maintained by the control modules 208C illustratively comprise at least one A2H table and possibly also at least one H2D table. The A2H tables are utilized to store address-to-hash mapping information and the H2D tables are utilized to store hash-to-data mapping information, in support of mapping of logical addresses for respective pages to corresponding physical addresses for those pages via respective hashes or other types of content-based signatures, as described in further detail elsewhere herein. In illustrative embodiments, the memory utilized to store portions of any of the A2H table, H2D table, HMD table or PLD table may be allocated from or deallocated to the dynamic pool 224 on an as needed basis by their respective modules of the storage controller 208, for example, when new mappings are added or existing mappings are deleted from the tables.

The control modules 208C may further comprise additional components such as respective messaging interfaces that are utilized by the control modules 208C to process routing-to-control messages received from the routing modules 208R, and to generate control-to-routing messages for transmission to the routing modules 208R. Such messaging interfaces can also be configured to process instructions and other messages received from the management module 208M and to generate messages for transmission to the management module 208M.

The data modules 208D comprise respective control interfaces. These control interfaces support communication between the data modules 208D and the control modules 208C. Also included in the data modules are respective SSD interfaces. These SSD interfaces support communications with corresponding ones of the storage devices 206 of the CAS system 205.

The above-described processing module arrangements are presented by way of example only, and can be varied in other embodiments.

In some embodiments, a given data path of the CAS system 205 comprises a particular one of the routing modules 208R, a particular one of the control modules 208C and a particular one of the data modules 208D, each configured to handle different stages of the data path. For example, a given IO request can comprise a read request or a write request received in the particular control module from the particular routing module. The particular control module processes the received IO request to determine the particular data module that has access to the one or more data pages targeted by that IO request.

Communication links may be established between the various processing modules of the storage controller 208 using well-known communication protocols such as TCP/IP and RDMA. For example, respective sets of IP links used in data transfer and corresponding messaging could be associated with respective different ones of the routing modules 208R.

In some embodiments, at least portions of the metadata storage functionality for persistently storing metadata in the CAS system are distributed over at least the control modules 208C and data modules 208D of storage controller 208. Numerous other arrangements are possible. For example, portions of the functionality can be implemented in the one or more management modules 208, or using other types and arrangements of modules within or outside of the storage controller 208.

As indicated previously, the storage devices 206 are configured to store metadata pages 220, user data pages 222, the dynamic pool 224 and one or more of the journals in the set of distributed journals 214, and may also store additional information not explicitly shown such as, for example, one or more system checkpoints and/or snapshots of storage volumes. The metadata pages 220, the user data pages 222 and the dynamic pool 224 in some embodiments are illustratively stored in respective designated metadata, user data and dynamic pool areas of the storage devices 206. Accordingly, metadata pages 220, user data pages 222 and dynamic pool 224 may be viewed as corresponding to respective designated metadata, user data and dynamic pool areas of the storage devices 206.

As noted above, a given "page" as the term is broadly used herein should not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 220 and the user data pages 222.

The user data pages 222 are part of a plurality of logical storage volumes configured to store files, blocks, objects or other arrangements of data, each also generally referred to herein as a "data item," on behalf of users of the CAS system 205. Each such logical storage volume may comprise particular ones of the above-noted user data pages 222 of the user data area. The user data stored in the user data pages 222 can include any type of user data that may be utilized in the system 100. The term "user data" herein is therefore also intended to be broadly construed.

A given storage volume for which content-based signatures are generated, illustratively by signature generators implemented in respective ones of the control modules 208C and/or elsewhere in the storage nodes 202, can comprise a set of one or more LUNs, each including multiple ones of the user data pages 222 stored in storage devices 206.

The CAS system 205 in the embodiment of FIG. 2 is configured to generate hash metadata providing a mapping between content-based digests of respective ones of the user data pages 222 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 222. The hash metadata generated by the CAS system 205 is illustratively stored as metadata pages 220 in the metadata area. The generation and storage of the hash metadata is assumed to be performed under the control of the storage controller 208.

Each of the metadata pages 220 characterizes a plurality of the user data pages 222. For example, in a given set of user data pages representing a portion of the user data pages 222, each of the user data pages is characterized by a volume identifier, an offset and a content-based signature. The content-based signature is generated as a hash function of content of the corresponding user data page. Illustrative hash functions that may be used to generate the content-based signature include the above-noted SHA1 secure hashing algorithm, or other secure hashing algorithms known to those skilled in the art, including SHA2, SHA256 and many others. The content-based signature is utilized to determine the location of the corresponding user data page within the user data area of the storage devices 206.

Each of the metadata pages 220 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 220 in an illustrative embodiment comprises metadata pages having respective signatures. Each such metadata page characterizes a different set of user data pages. For example, the characterizing information in each metadata page can include the volume identifiers, offsets and content-based signatures for each of the user data pages that are characterized by that metadata page. It is to be appreciated, however, that the user data and metadata page configurations described above are examples only, and numerous alternative user data and metadata page configurations can be used in other embodiments.

Ownership of a user data logical address space within the CAS system 205 is illustratively distributed among the control modules 208C.

In some embodiments, each of the user data pages 222 has a fixed size such as, for example, 8 KB, and its content-based signature is a 20-byte signature generated using the SHA1 secure hashing algorithm. Also, each page has a volume identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

The storage controller 208 in this example is configured to group consecutive pages into page groups, to arrange the page groups into slices, and to assign the slices to different ones of the control modules 208C. For example, if there are 1024 slices distributed evenly across the control modules 208C, and there are a total of 16 control modules in a given implementation, each of the control modules "owns" 1024/16=64 slices. In such arrangements, different ones of the slices are assigned to different ones of the control modules 208C such that control of the slices within the storage controller 208 of the CAS system 205 is substantially evenly distributed over the control modules 208C of the storage controller 208.

The data modules 208D allow a user to locate a given user data page based on its signature. Each metadata page also has a size of 8 KB and includes multiple instances of the <lun_id, offset, signature> for respective ones of a plurality of the user data pages 222. Such metadata pages 220 are illustratively generated by the control modules 208C but are accessed using the data modules 208D based on a metadata page signature.

The metadata page signature in this embodiment is a 20-byte signature but is not based on the content of the metadata page. Instead, the metadata page signature is generated based on an 8-byte metadata page identifier that is a function of the volume identifier and offset information of that metadata page.

If a user wants to read a user data page having a particular volume identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the data module. This metadata page will include the <lun_id, offset, signature> for the user data page if the user page exists. The signature of the user data page is then used to retrieve that user data page, also via the data module.

Write requests processed in the CAS system 205 each illustratively comprise one or more IO operations directing that at least one data item of the CAS system 205 be written to in a particular manner. A given write request is illustratively received in the CAS system 205 from one of the host devices 101 over network 104. In some embodiments, a write request is received in the storage controller 208 of the CAS system 205, and directed from one processing module to another processing module of the storage controller 208. For example, a received write request may be directed from a routing module 208R of the storage controller 208 to a particular control module 208C of the storage controller 208. Other arrangements for receiving and processing write requests from one or more of the host devices 101 can be used.

The term "write request" as used herein is intended to be broadly construed, so as to encompass one or more IO operations directing that at least one data item of a storage system be written to in a particular manner. A given write request is illustratively received in a storage system from a host device.

In some embodiments, the control modules 208C, data modules 208D and routing modules 208R of the storage nodes 202 communicate with one another over a high-speed internal network such as an InfiniBand network. The control modules 208C, data modules 208D and routing modules 208R coordinate with one another to accomplish various IO processing tasks, as described elsewhere herein.

The write requests from the host devices identify particular data pages to be written in the CAS system 205 by their corresponding logical addresses each illustratively comprising a volume identifier and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The CAS system 205 illustratively utilizes a two-level mapping process to map logical block addresses to physical block addresses. In some embodiments, the first level of mapping uses an A2H table and the second level of mapping uses an HMD table, with the A2H and HMD tables corresponding to respective logical and physical layers of the content-based signature mapping within the CAS system 205. The HMD table or a given portion thereof in some embodiments disclosed herein is more particularly referred to as an H2D table or H2P table, although it is to be understood that these and other mapping tables or other metadata structures referred to herein can be varied in other embodiments.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 206. This is also referred to as physical layer mapping.

Examples of these and other metadata structures utilized in illustrative embodiments were described elsewhere herein. These particular examples illustratively include respective A2H, H2D, HMD and PLB tables. In some embodiments, the A2H and H2D tables are utilized primarily by the control modules 208C, while the HMD and PLB tables are utilized primarily by the data modules 208D.

For a given write request, hash metadata comprising at least a subset of the above-noted tables is updated in conjunction with the processing of that write request.

The A2H, H2D, HMD and PLB tables described above are examples of what are more generally referred to herein as "mapping tables" of respective distinct types. Other types and arrangements of mapping tables or other content-based signature mapping information may be used in other embodiments.

Such mapping tables are still more generally referred to herein as "metadata structures" of the CAS system 205. It should be noted that additional or alternative metadata structures can be used in other embodiments. References herein to particular tables of particular types, such as A2H, H2D, HMD and PLB tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the CAS system 205 correspond to respective physical blocks of a physical layer of the CAS system 205. The user data pages of the logical layer are organized by LBA and have reference via respective content-based signatures to particular physical blocks of the physical layer.

Each of the physical blocks has an associated reference count that is maintained within the CAS system 205. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 208C, 208D, 208R and 208M as shown in the FIG. 2 embodiment is presented by way of example only. Numerous alternative arrangements of processing modules of a distributed storage controller may be used to implement metadata storage in a distributed CAS system or other type of distributed storage system in other embodiments.

Additional examples of content addressable storage functionality that may be implemented in some embodiments by control modules 208C, data modules 208D, routing modules 208R and management module(s) 208M of storage controller 208 can be found in U.S. Pat. No. 9,104,326, entitled "Scalable Block Data Storage Using Content Addressing," which is incorporated by reference herein. Alternative arrangements of these and other storage node processing modules of a distributed storage controller in a distributed CAS system or other type of distributed storage system can be used in other embodiments.

As indicated above, the CAS system 205 illustratively comprises storage nodes 202 interconnected in a mesh network, with each such storage node comprising a set of processing modules configured communicate with corresponding sets of processing modules on other ones of the storage nodes. A given such set of processing modules comprises at least a routing module, a control module and a data module, with the sets of processing modules of the storage nodes 202 of the CAS system 205 collectively comprising at least a portion of the storage controller 208 of the CAS system 205.

The storage nodes 202 and their respective sets of processing modules are managed by a system manager, illustratively implemented as a management module 208M within the set of processing modules on at least one of the storage nodes 202. Each of the storage nodes 202 illustratively comprises a CPU or other type of processor, a memory, a network interface card (NIC) or other type of network interface, and a subset of the storage devices 206, possibly arranged as part of a DAE of the storage node. These and other references to "disks" herein are intended to refer generally to storage devices, including SSDs, and should therefore not be viewed as limited in any way to spinning magnetic media.

An example of the operation of the CAS system 205 in processing IO operations will now be described with reference to FIG. 3, which shows the relationship between routing, control and data modules of one possible distributed implementation of CAS system 205 in an illustrative embodiment. More particularly, FIG. 3 illustrates a portion 300 of the CAS system 205, showing a routing module 208R-x, a control module 208C-y and a data module 208D-z in a distributed implementation of the storage controller 208. The routing module 208R-x, the control module 208C-y and the data module 208D-z are also denoted in this embodiment as an R-module, a C-module and a D-module, respectively.

These modules are respective processing modules of the storage controller 208, and are potentially located on different ones of the storage nodes 202 of the CAS system 205. For example, each of the storage nodes 202 of the CAS system 205 illustratively comprises at least one R-module, at least one C-module and at least one D-module, although many other storage node configurations are possible. In the present embodiment, the routing module 208R-x, the control module 208C-y and the data module 208D-z are assumed to be on respective different storage nodes x, y and z of the CAS system 205. The storage nodes x, y and z represent respective particular ones of the storage nodes 202. The storage node z that implements the D-module 208D-z comprises a subset of the storage devices 206 of the CAS system 205, with the subset of storage devices 206 on storage node z being denoted as storage devices 206-z. Each of the other storage nodes 202 of the CAS system 205 similarly has a different subset of the storage devices 206 associated therewith.

It is assumed in this example that the CAS system 205 manages data using a fixed-size page granularity (e.g., 4 KB, 8 KB or 16 KB), also referred to herein as the native page size of the CAS system 205. A unique hash digest is computed for each of the data pages by a content-based signature generator, illustratively using SHA1 or another secure hashing algorithm of the type described elsewhere herein.

In the CAS system 205, routing modules 208R such as R-module 208R-x illustratively include a storage command parser as shown, such as a SCSI command parser, although other command parsers for other storage protocols can be used in other embodiments. The routing modules 208R receive IO requests from one or more of the host devices 101, parse the corresponding storage commands and route them to the appropriate control modules 208C, which may be located on different storage nodes 202, illustratively using an address-to-control (A2C) table. The A2C table maps different portions of a logical address space of the CAS system 205 across different ones of the control modules 208C. A given IO request can be sent by the corresponding one of the host devices 101 to any of the routing modules 208R of the CAS system 205.

The control modules 208C such as control module 208C-y receive the IO requests from the routing modules 208R, and use mapping tables such as the above-described A2H and H2D tables to identify the appropriate data modules 208D that store the corresponding data pages in the distributed CAS system 205. This illustratively includes performing a logical address to hash mapping as shown in the figure.

In processing read requests, the C-module 208C-y retrieves from the A2H table the hash digests of the corresponding requested pages, and sends read requests to the appropriate data modules 208D based on the H2D table.

In processing write requests, the C-module 208C-y illustratively computes the hash digests of the data pages based on the write data, sends write requests to the corresponding data modules 208D as determined from the H2D table, and updates the A2H table.

The data modules 208D such as D-module 208D-z are responsible for the physical storage of the data pages, and use mapping tables such as the above-described HMD and PLB tables and/or other types of H2P tables to determine the physical location of a given data page in the subset of storage devices 206 associated with that data module, using a hash digest, hash handle or other content-based signature supplied by a control module. This illustratively includes performing a hash to physical location mapping as shown in the figure. Such a hash to physical location mapping can utilize an H2P table of the type described elsewhere herein, illustratively comprising at least portions of the above-noted HMD and PLB tables. The data modules 208D in some embodiments additionally store a copy or "mirror" of such metadata in a memory of the respective corresponding storage nodes 202, in order to optimize performance by reducing accesses to the associated storage devices 206 during system operation.

A given one of the host devices 101 illustratively sends an IO request to a particular one of the routing modules 208R, possibly using random selection or another type of algorithm such as round robin to select a particular routing module for a particular IO request. Such selection can be implemented as part of a path selection algorithm performed by a multi-path input-output (MPIO) driver of the host device, in order to select a particular path comprising an initiator-target pair for delivery of the IO request to the CAS system 205. The initiator illustratively comprises a particular host bus adaptor (HBA) of the given host device, and the target illustratively comprises a particular port of the CAS system 205.

The processing of write requests in the CAS system 205 makes use of the distributed write cache 212 and the distributed write cache journal of the set of distributed journals 214, as will now be described in more detail. For example, such processing can include first, second and third stages in the processing of a given write request, with the stages also being referred to herein as Stage 1, Stage 2 and Stage 3, respectively.

The write cache 212 illustratively comprises a volatile memory of the CAS system 205 for temporarily storing data pages associated with write requests received from the host devices 101. The write cache 212 is backed up by the write cache journal that stores persisted copies of the write data. The write data of the write cache 212 is later destaged to a persistent data storage location in the storage devices 206. For write requests received by the CAS system 205, address locks are placed on corresponding data pages, illustratively by associated ones of the control modules 208C, until the destaging of those data pages from the write cache 212 is completed.

A given write request targeting a particular data page in the CAS system 205 is illustratively processed by one of the control modules 208C and one of the data modules 208D in accordance with the following multi-stage process, the primary steps of which correspond generally to Stage 1, Stage 2 and Stage 3 of the processing of a given write request:

1. Front-end write request processing by control module. This is a synchronous stage handled by a particular control module, initiated upon receipt of the write request from one of the routing modules 208R. The data page is stored in an entry of the write cache 212 and persisted in the write cache journal, and the write request is then acknowledged back to the host device. The A2H table entry corresponding to the logical address of the data page being written is updated to point to the entry of the data page in the write cache 212.

2. Write cache destaging to data module. This is an asynchronous stage initiated by the control module to destage the data page to its appropriate destination data module. This stage more particularly implements an example write cache destaging process that includes the following steps:
   (a) Control module acquires address lock for data page;
   (b) Control module sends destage request to data module;
   (c) Data module loads associated metadata into RAM if not already loaded;
   (d) Data module writes data page and associated metadata and replies to control module with the hash digest of the data page;
   (e) Control module updates its A2H table to include the hash digest of the data page; and
   (f) Control module releases address lock for data page.

3. Background destaging from data module to storage device. This is an asynchronous stage initiated by the data module that persists the data page to a storage device associated with the data module. The data module stores the data page in the storage device and then updates its H2P table to point to the corresponding physical location.

The second stage as described above may be viewed an example of what is more generally referred to herein as a "write cache destaging process." That term as broadly used herein can encompass other types of additional or alternative processing operations, and may include at least portions of one or more other stages.

At the completion of the second stage, the data associated with the write request is still not written to the storage devices 206. The data is stored in the volatile memories of the write cache 212 and the data module 208D, and is persisted in the write cache journal for backup and recovery purposes.

The third stage of the write request handling process is illustratively performed asynchronously with the first and second stages, but in other embodiments may be performed synchronously with one or both of the other stages.

At the completion of the third stage, the data is persisted in the storage devices 206 so the corresponding write cache entry and its write cache journal entry are no longer needed, and can be deleted.

Other types and arrangements of write request processing stages can be used in other embodiments.

The CAS system 205 is configured to store metadata pages in the persistent storage devices 206 of the storage nodes 202 using operations similar to those previously described in conjunction with FIG. 1.

These and other operations associated with metadata storage in the CAS system 205 are illustratively performed at least in part by or under the control of the storage controller 208 and at least a subset of its processing modules 208C, 208D, 208R and 208M.

The particular features described above in conjunction with FIGS. 2 and 3 should not be construed as limiting in any way, and a wide variety of other distributed implementations of storage nodes 202 are possible.

The particular set of storage nodes 102 or 202 of the respective example distributed storage systems illustrated in FIGS. 1 and 2 is assumed to be implemented using at least one processing platform, with each such processing platform comprising one or more processing devices, and each such processing device comprising a processor coupled to a memory. Such processing devices can illustratively include particular arrangements of compute, storage and network resources.

The storage nodes may be implemented on respective distinct processing platforms, although numerous other arrangements are possible. At least portions of their associated host devices may be implemented on the same processing platforms as the storage nodes or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the storage nodes 102 to reside in different data centers. Numerous other distributed implementations of the storage nodes 102 and their respective associated sets of host devices are possible. Similarly, various distributed implementations of CAS system 205 and its storage nodes 202 are possible.

Additional examples of processing platforms utilized to implement storage systems and possibly their associated host devices in illustrative embodiments will be described in more detail below in conjunction with FIGS. 10 and 11.

It is to be appreciated that these and other features of illustrative embodiments are presented by way of example only, and should not be construed as limiting in any way.

Accordingly, different numbers, types and arrangements of system components such as host devices 101, storage nodes 102 or 202, network 104, storage devices 106 or 206, storage controllers 108 or 208 and metadata storage logic 110 can be used in other embodiments.

Figure 3:
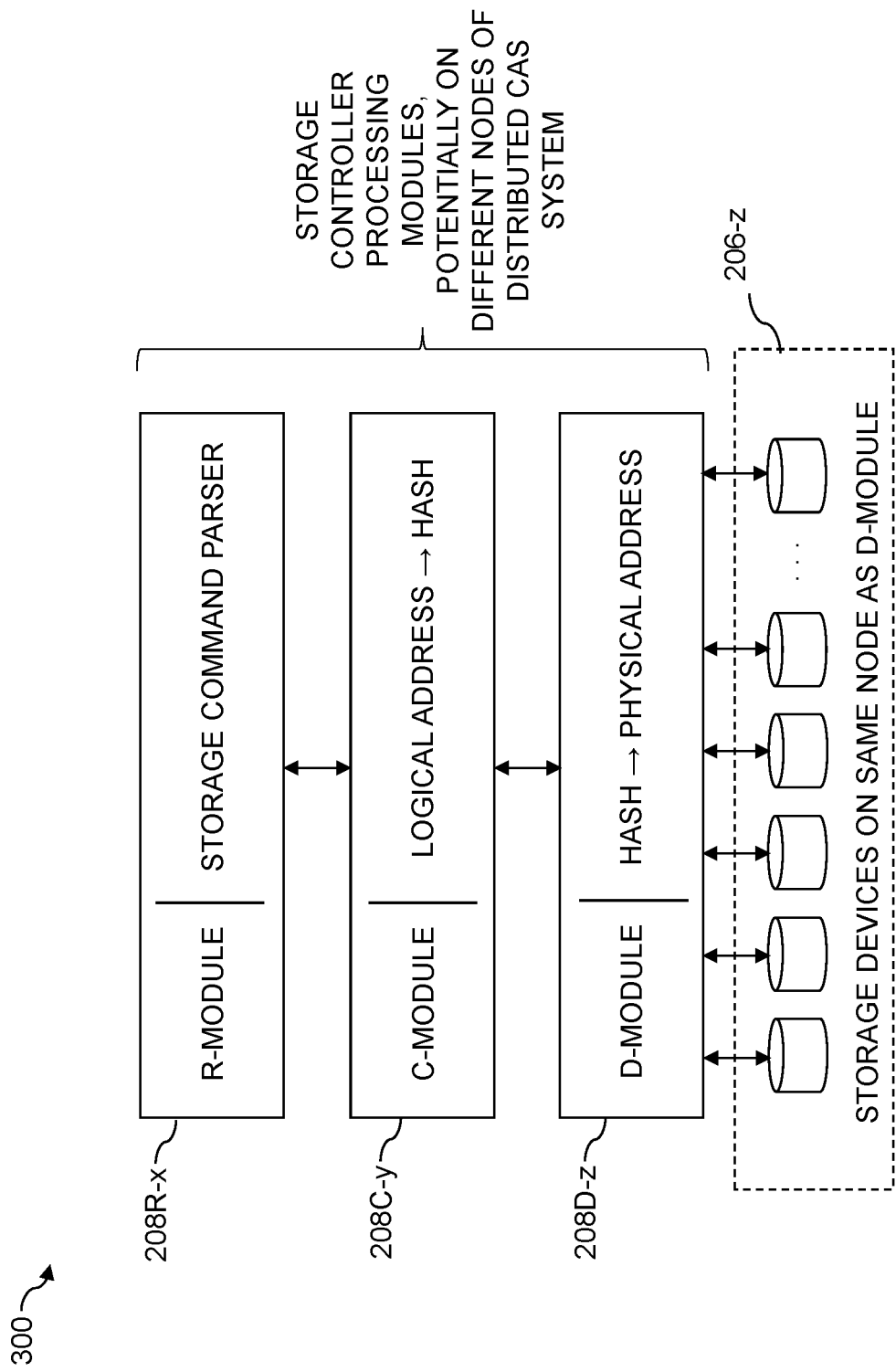
FIG. 3 shows an example relationship between routing, control and data modules of the distributed CAS system of FIG. 2 in an illustrative embodiment.

It should be understood that the particular sets of modules and other components implemented in a distributed storage system as illustrated in FIGS. 1, 2 and 3 are presented by way of example only. In other embodiments, only subsets of these components, or additional or alternative sets of components, may be used, and such components may exhibit alternative functionality and configurations.

For example, in other embodiments metadata storage functionality for the persistent storage of metadata pages can be implemented in one or more host devices, or partially in a host device and partially in a storage system. Accordingly, illustrative embodiments are not limited to arrangements in which all such functionality is implemented in a storage system or a host device, and therefore encompass various hybrid arrangements in which the functionality is distributed over one or more storage systems and one or more associated host devices, each comprising one or more processing devices.

The operation of the information processing system 100 will now be described in further detail with reference to the illustrative embodiments of FIGS. 4-6, which show an example metadata storage configuration, and the flow diagrams of FIGS. 7-9, which illustrates processes for metadata storage in a distributed storage system.

As information processing systems, such as information processing system 100, are required to support larger and larger numbers of logical storage volumes, including virtual logical storage volumes, the storage capacity and processing that is needed to support the corresponding metadata pages can increase significantly.

As an example, in a system where there are 64 million buckets, a 16-bit volume identifier (also referred to herein as a lun_id or LUN ID) with a 10-bit slice offset may be utilized to access a given bucket comprising a given metadata page stored on the storage devices 106, where each bucket is represented by a structure of 6 bytes. In such an example system, 384 megabytes (MB) (64 million x 6 bytes) would be utilized for persistently storing the corresponding metadata pages. As the number of logical storage volumes increases, the number of metadata pages that need to be stored will also increase. To handle the additional metadata pages, a number of approaches maybe utilized.

In one example approach, the number of buckets may be increased, e.g., to correspond to a 24-bit volume identifier with a 10-bit slice offset. As an example, approximately 16 billion buckets may be maintained for 16 million logical storage volumes. In such an approach, 96 gigabytes (GB) (16 billion x 6 bytes) would be utilized for persistently storing the corresponding metadata pages. Even assuming just 2 million logical storage volumes, approximately 2 billion buckets and an array size of 12 GB would still be needed for storing the corresponding metadata pages. However, maintaining even a 12 GB array may consume a large amount of memory and processing resources in the storage system regardless of how many logical storage volumes are actually provisioned for use in the system.

Another example approach may utilize the same number of buckets even when a larger number of logical storage volumes is needed. For example, the same 64 million buckets may be utilized for accessing the corresponding metadata pages for any number of logical storage volumes. In such an approach, while the volume identifier format for the larger number of logical volumes may need more than 2 bytes, e.g., 3 or more bytes, only the first 2 bytes of the volume identifier and the 10-bit slice offset may be utilized to access the persistently stored metadata pages on the storage devices 106. In such an example approach, each bucket may comprise metadata pages that correspond to multiple logical storage volumes, e.g., 255 logical storage volumes in one example.

In some scenarios, such an approach may result in result in reduced system performance where, for example, a system that utilizes demote functionality, e.g., doesn't load the A2H mapping fully into memory from the storage devices and instead just loads portions that are currently being utilized. In another example scenario, reduced system performance may occur in a system that performs a per-logical storage volume operation such as, e.g., a delete operation where the storage controller 108 may now be required to access the bucket and delete or manipulate only the portion of its contents that correspond to that logical storage volume.

In another example scenario, when the storage system or one or more of the storage nodes are started or re-started, e.g., after a failure event, the storage system may lazy-load its metadata pages. During the lazy loading, the storage controllers 108 of the system may begin servicing IO operations while still loading the metadata pages from the persistent storage devices to the memory, e.g., cache, in a background process or on-demand. During such a lazy-load, in an ideal case, all of the metadata pages will eventually be loaded into memory such that the use of demote functionality is not needed. However, in a case where demote functionality is implemented and in use, loading or demoting metadata pages corresponding to a single logical storage volume now requires an extra step of determining which metadata pages in a given bucket correspond to that logical storage volume and which metadata pages correspond to logical volumes that are not relevant to the load or demote operation, which may result in reduced system performance.

In one example approach, the impact to system performance may be reduced by spreading the logical storage volume identifiers differently. For example, instead of a simple incremental allocator, e.g., 1, 2, 3, ..., etc., a sparse allocator may be utilized, e.g., 1, 255, 512, etc. The use of a sparce allocator results in a lower potential performance impact for the first group of logical storage volumes, e.g., the first 64 thousand logical storage volumes, with the impact increasing linearly as the number of logical storage volumes increases, e.g., with 128 thousand logical storage volumes there will be two logical storage volumes per bucket. However, for a significantly larger number of logical storage volumes, e.g., 2 million logical storage volumes, such an approach will still have approximately 32 logical storage volumes per bucket which may still cause reduced performance in the storage system due to the need to access the bucket and differentiate between the metadata pages for the corresponding logical storage volumes.

While the above examples are described with reference to particular number or sizes of logical volumes, buckets, metadata pages, etc., these numbers and sizes are provided as examples only and any other numbers or sizes may also or alternatively be utilized for these components of the storage system.

With reference again to FIGS. 4-6, illustrative embodiments of an information processing system 100 implementing metadata storage logic 110 will now be described. Metadata storage logic 110 is configured to support a large number of logical storage volumes under the constraint that there is sufficient available space in the cluster through the use of the dynamic pool 124. In some cases, a storage system having a large number of logical storage volumes may imply that each individual logical storage volume may be relatively small as compared to those logical storage volumes in a storage system having a smaller number of logical volumes.

The dynamic pool 124 is configured to manage the memory of the storage devices 106 that is not allocated statically to a particular purpose such as user data pages, metadata pages, the A2H mapping table, the H2D mapping table, the HMD table, the PLD table, cache, or any other component of the storage system. The allocation from the dynamic pool 124 corresponds to data written to the cluster. For example, when new data is written to the cluster, the various components of the storage controller 108 allocate memory from the dynamic pool 124. For example, the storage controller 108 may allocate memory from the dynamic pool 124 for use by the A2H mapping table and the H2P address mapping table when new entries need to be added to these tables.

In illustrative embodiments, the storage controller 108 may also allocate memory of the dynamic pool 124 for use in persistently storing metadata pages on the storage devices 106, e.g., the HBBKUP pages. By utilizing the dynamic pool 124 for allocating memory for use in storing the metadata pages, a trade-off between the amount of memory used and the number of logical storage volumes that are active and allocated in the storage system may be achieved. For example, in a case where there is not enough memory in the dynamic pool 124 to allocate for the metadata pages corresponding to a newly created logical storage volume, the creation volume operation that is executed by the storage controller 108 to create that logical storage volume may fail. In addition, by utilizing the dynamic pool 124 for allocating memory to the metadata pages and the corresponding A2H and HMD mappings, an improved balance between the memory allocated to these components of the storage system may be achieved.

In some embodiments, the metadata storage logic 110 implemented by storage controller 108 is configured to statically allocate a first portion of the storage devices 106, e.g., separate from the dynamic pool 124, for use in persistently storing some metadata pages and to dynamically allocate a second portion of the storage devices 106, e.g., memory from the dynamic pool 124, for use in persistently storing additional metadata pages on an as needed basis. As an example, the metadata storage logic 110 may be configured to maintain 384 MB of static memory for storing the metadata pages corresponding to an initial 64 thousand logical storage volumes. In a case where a new logical storage volume is being added to the storage system and the initial 64 thousand logical storage volumes are already in use, the metadata storage logic 110 may attempt to allocate memory for one or more additional buckets worth of metadata pages from the dynamic pool 124 for persistently storing the metadata pages corresponding to the new logical storage volume.

Metadata storage logic 110 is configured to reserve the possibility of creating a predetermined number of logical storage volumes where, for example, the maximum number of possible logical storage volumes may be set initially, e.g., during setup of the storage system. The metadata storage logic 110 implements a two-hierarchy configuration for storing the metadata on the storage devices 106. For example, metadata storage logic 110 maintains a data structure of bucket ranges, each corresponding to a plurality of buckets. While the data structure of bucket ranges may be implemented statically, the memory corresponding to buckets for at least some of the bucket ranges may remain unallocated until needed for storing metadata pages.

Figure 4:
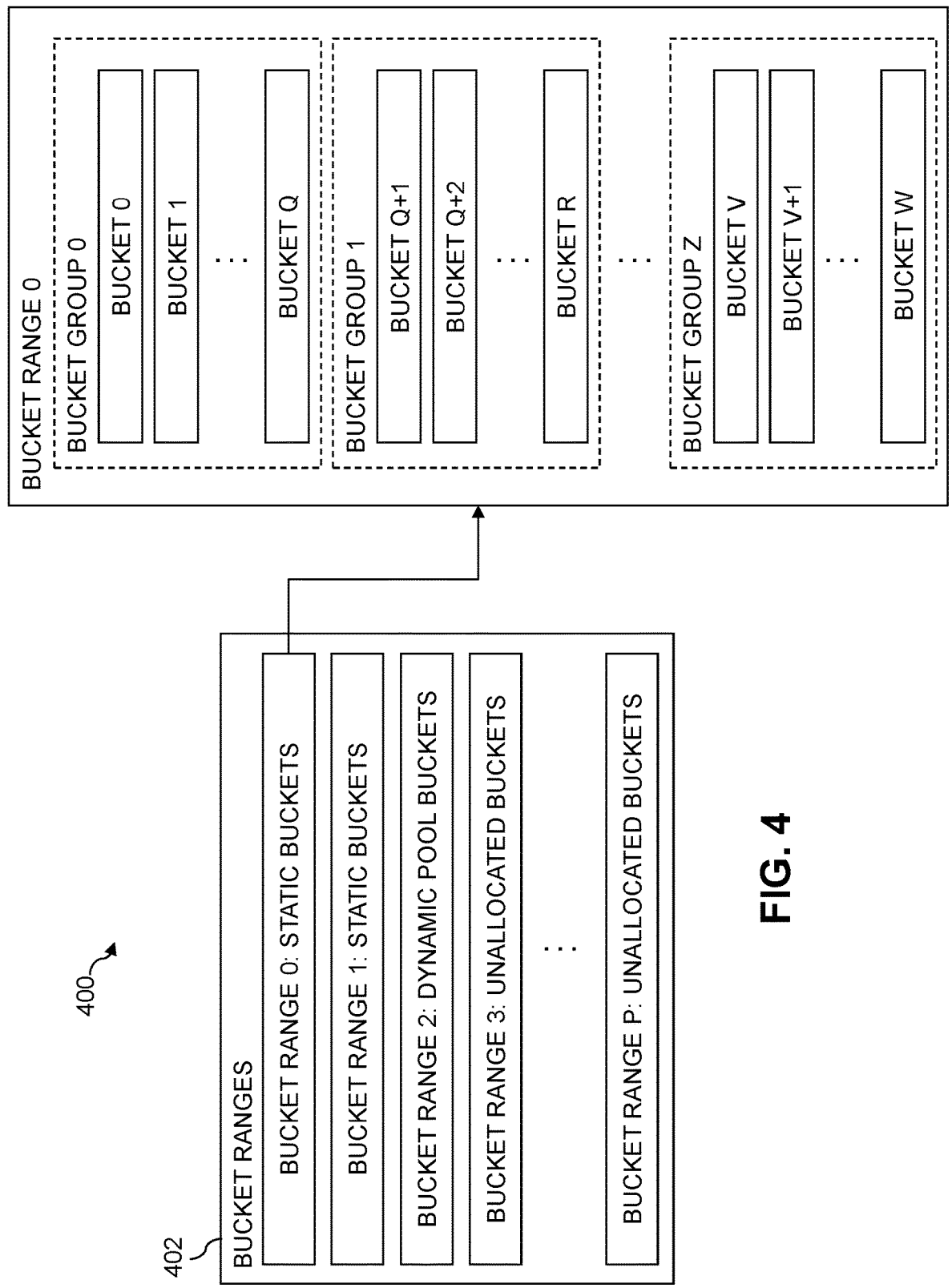
FIGS. 4 and 5 show an example configuration for persistently storing metadata pages on the storage devices of a distributed storage system in illustrative embodiments.
Figure 5:
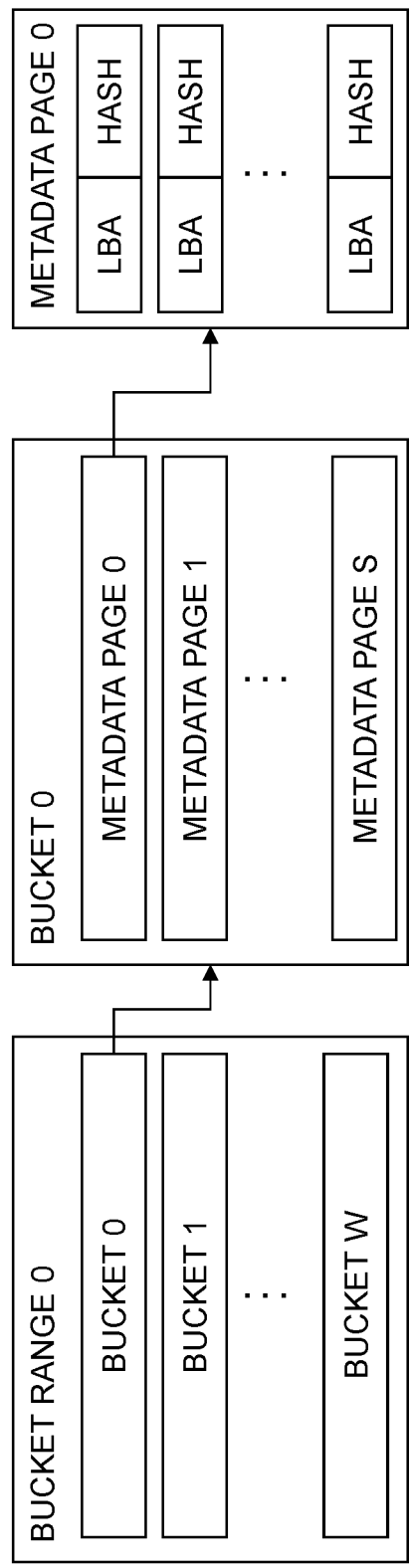

With reference now to FIGS. 4 and 5, an example two-hierarchy configuration 400 is illustrated according to an illustrative embodiment. As seen in FIG. 4, a data structure of bucket ranges 402 comprises a plurality of bucket range entries, each corresponding to a particular bucket range, e.g., bucket range 0, bucket range 1, bucket range 2, bucket range 3 . . . bucket range P. In the example shown in FIG. 4, bucket ranges 0 and 1 are statically allocated bucket ranges, e.g., the corresponding buckets are allocated statically from memory of the storage devices 106 and not available to be deallocated or released for use by the dynamic pool 124, bucket range 2 is dynamically allocated from the dynamic pool 124, and bucket ranges 3 through P remain unallocated, e.g., because no corresponding logical storage volumes have been allocated or added to the storage system. Each bucket range corresponds to a plurality of buckets, e.g., buckets 0 through W in the example of bucket range 0 in FIG. 4.

In some cases, the buckets may be logically grouped into bucket groups that each correspond to a logical storage volume by the metadata storage logic 110. For example, buckets 0, 1 . . . Q may be logically grouped into bucket group 0, buckets Q+1, Q+2 . . . R may be grouped into bucket group 1, . . . and buckets V, V+1 . . . W may be grouped into bucket group Z where each bucket group corresponds to a particular logical storage volume. While described as being logically grouped into bucket groups, an indication of such groupings may not be stored on the storage devices 102. For example, the buckets may correspond to particular addresses on the storage devices 106 and a given bucket group may be identified by the offset of the address corresponding to the first bucket in the given bucket group.

With reference now to FIG. 5, for example, bucket range 0 may comprise buckets 0, 1 . . . W where each bucket comprises metadata pages corresponding to a particular logical storage volume. In this example, bucket 0 comprises metadata pages 0, 1 . . . S where metadata page 0 comprises a plurality of entries with each entry comprising a mapping between an LBA and a corresponding content-based signature, e.g., a hash.

Figure 6:
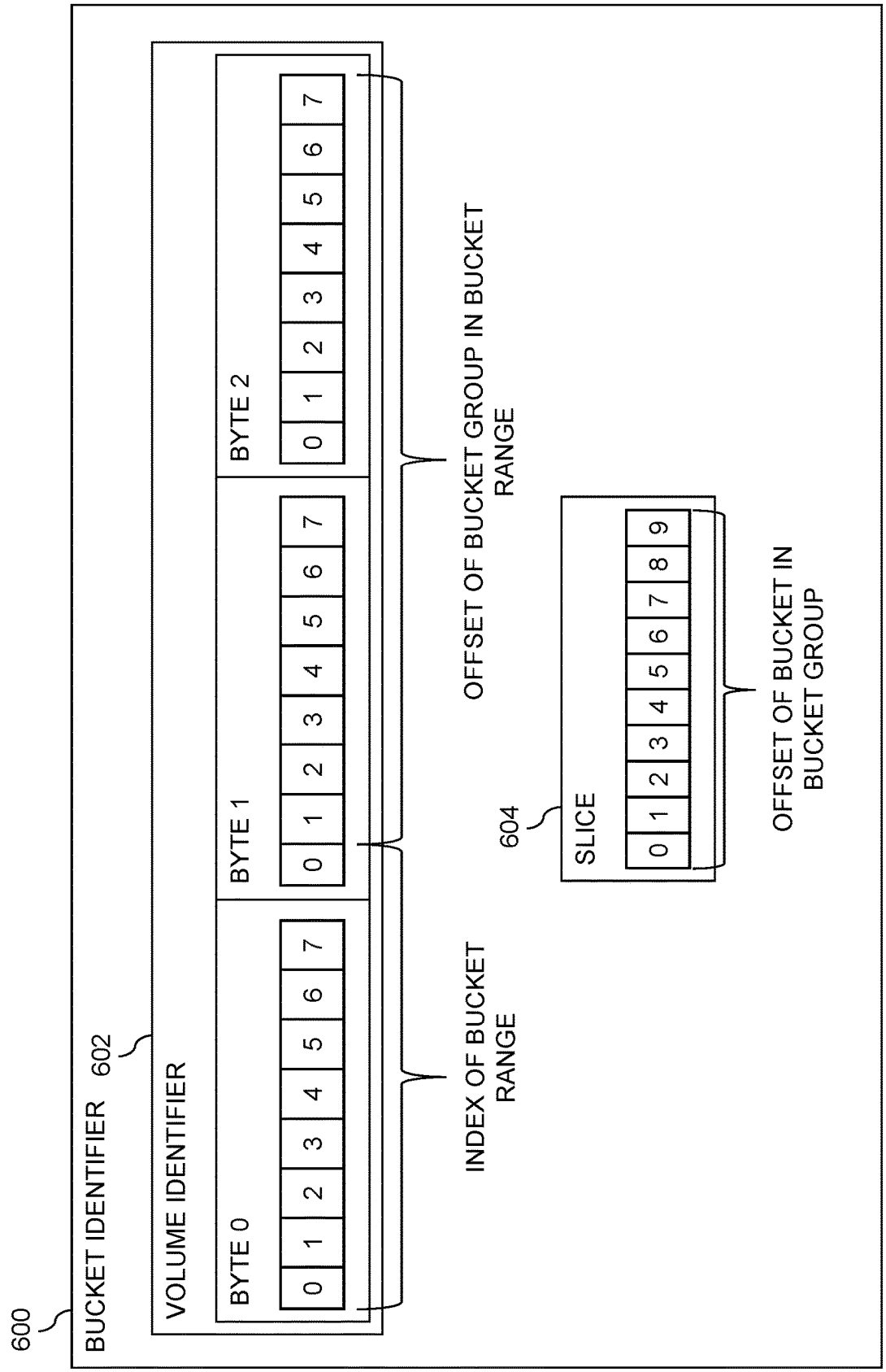
FIG. 6 shows an example bucket identifier configuration for accessing persistently stored metadata pages on the storage devices of a distributed storage system in illustrative embodiments.

With reference now to FIG. 6, metadata storage logic 110 is configured to access or obtain a particular bucket of metadata pages in illustrative embodiments through the use of a bucket identifier, e.g., bucket identifier 600, that comprises information corresponding to the particular bucket. In illustrative embodiments, the bucket identifier 600 comprises the volume identifier 602 corresponding to the particular metadata page and a slice offset 604.

For example, the volume identifier 602 comprises 3 bytes while the slice offset 604 comprises 10 bits. The volume identifier 602 corresponds to the logical storage volumes of the storage system where, for example, each logical volume may have a corresponding volume identifier 602. In an illustrative embodiment, the 9 most significant bits of the volume identifier 602 may be utilized by the metadata storage logic 110 as an index into the data structure of bucket ranges 402 to select the bucket range that corresponds to the target metadata page. The remaining 15 bits of the volume identifier may be utilized by the metadata storage logic 110 to determine an offset into the selected bucket range that corresponds to the first bucket of a bucket group that corresponds to the logical storage volume. The slice offset 604 may be utilized by the metadata storage logic 110 to determine which bucket in the logical bucket group comprises the target metadata page. For example, the value of the 10-bit slice offset 604 may correspond to an offset in the bucket group for the address comprising the target bucket. Once the target bucket has been located, the target bucket may be loaded into memory, e.g., cache, for use by the storage controller 108 in servicing corresponding IO operations.

While described in the above example as comprising 3 bytes (24 bits), the volume identifier 602 may alternatively have a larger or smaller number of bytes or bits. Similarly, while particular bits of the volume identifier 602 are referred to as being used to determine the index into the data structure of bucket ranges or the offset into the bucket range, any other number of bits or arrangement of bits of the volume identifier may alternatively be used for these purposes.

The metadata storage logic 110 is configured to utilize the two-hierarchy configuration and bucket identifier configuration described above in conjunction with the dynamic pool 124 to provide flexible usage of the memory resources of the storage device 106, e.g., since memory used to store the metadata pages that correspond to a given logical storage volume may be deallocated to the dynamic pool 124 when the logical storage volume is deleted, which allows the dynamic pool 124 memory to be freed up for storing additional data, mappings, metadata or for other purposes. For example, by utilizing the dynamic pool 124 for at least part of the memory required for the persistent storage of metadata pages on an as-needed basis, a cluster of nodes may efficiently scale to a larger number of volumes with the potential performance and memory impact of having additional metadata pages also scaling in a similar manner.

By utilizing metadata storage logic 110, clusters with a small number of logical storage volumes and corresponding buckets of metadata pages will have a minimal performance impact, e.g., because the memory for persistently storing the metadata pages corresponding to at least some of the buckets is statically allocated, while clusters that may scale up to a larger number of logical storage volumes are ensured to only allocate memory for storing metadata pages that actually correspond to allocated logical storage volumes. For example, an increase in logical storage volumes may result in an allocation of additional memory from the dynamic pool 124 until there is not enough memory left in the dynamic pool 124, at which point an add logical storage volume operation may be failed.

Each of the other storage nodes 102 of the distributed storage system of FIG. 1 is assumed to operate in a manner similar to that described above for the first storage node 102-1. For example, the above-described operations associated with metadata storage are illustratively performed at least in part by or under the control of the instances of metadata storage logic 110 in the storage controllers 108 of the respective ones of the different storage nodes 102.

Such operations provide illustrative examples of processes implementing metadata storage functionality in a distributed storage system comprising at least first and second storage nodes 102.

Additional or alternative steps may be used in such a process in other embodiments. Also, the ordering of the steps can be varied, and different portions of the process can be performed at least in part in parallel with one another.

Figure 7:
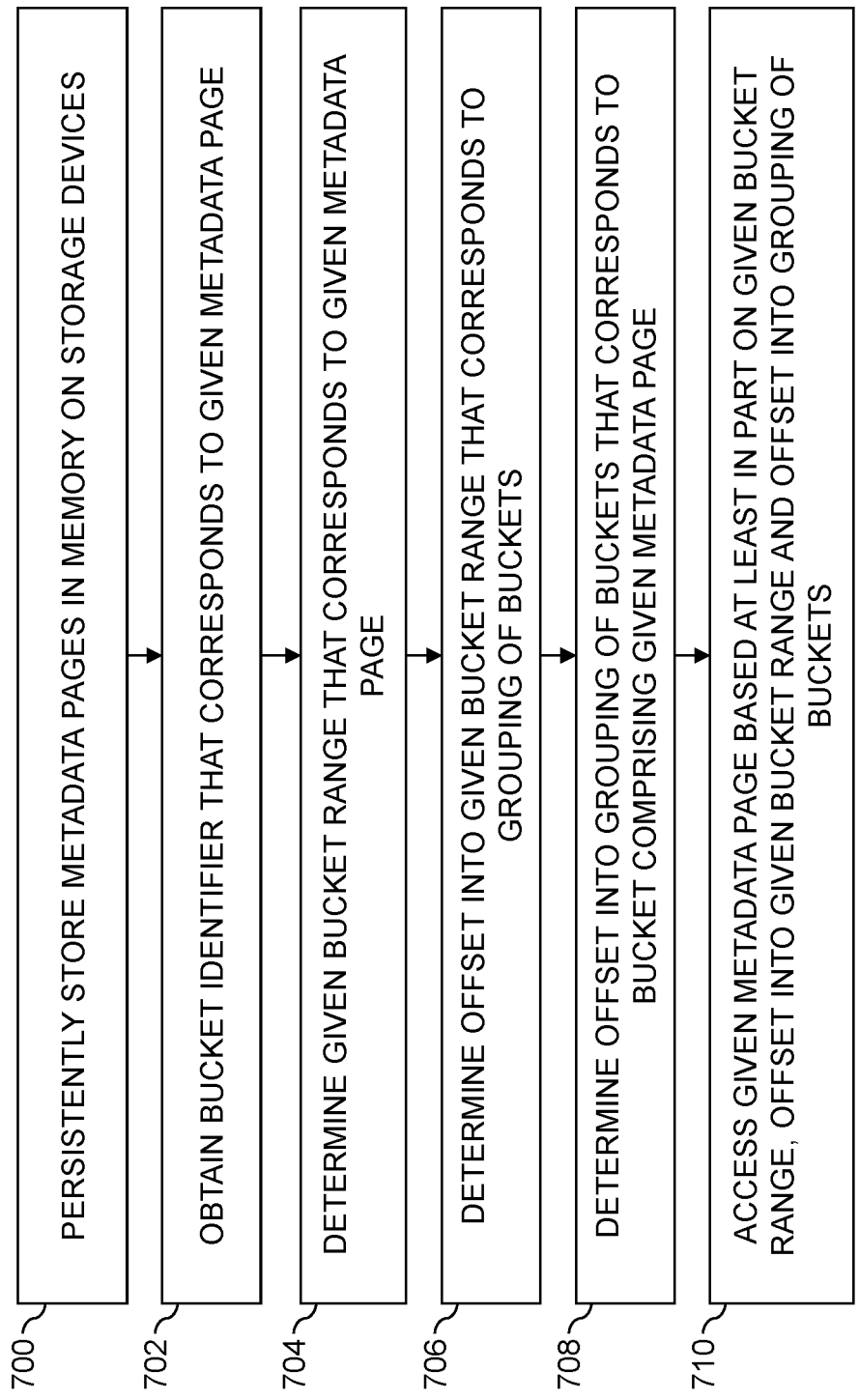
FIG. 7 is a flow diagram of an example process for accessing a metadata page in an illustrative embodiment.
Figure 8:
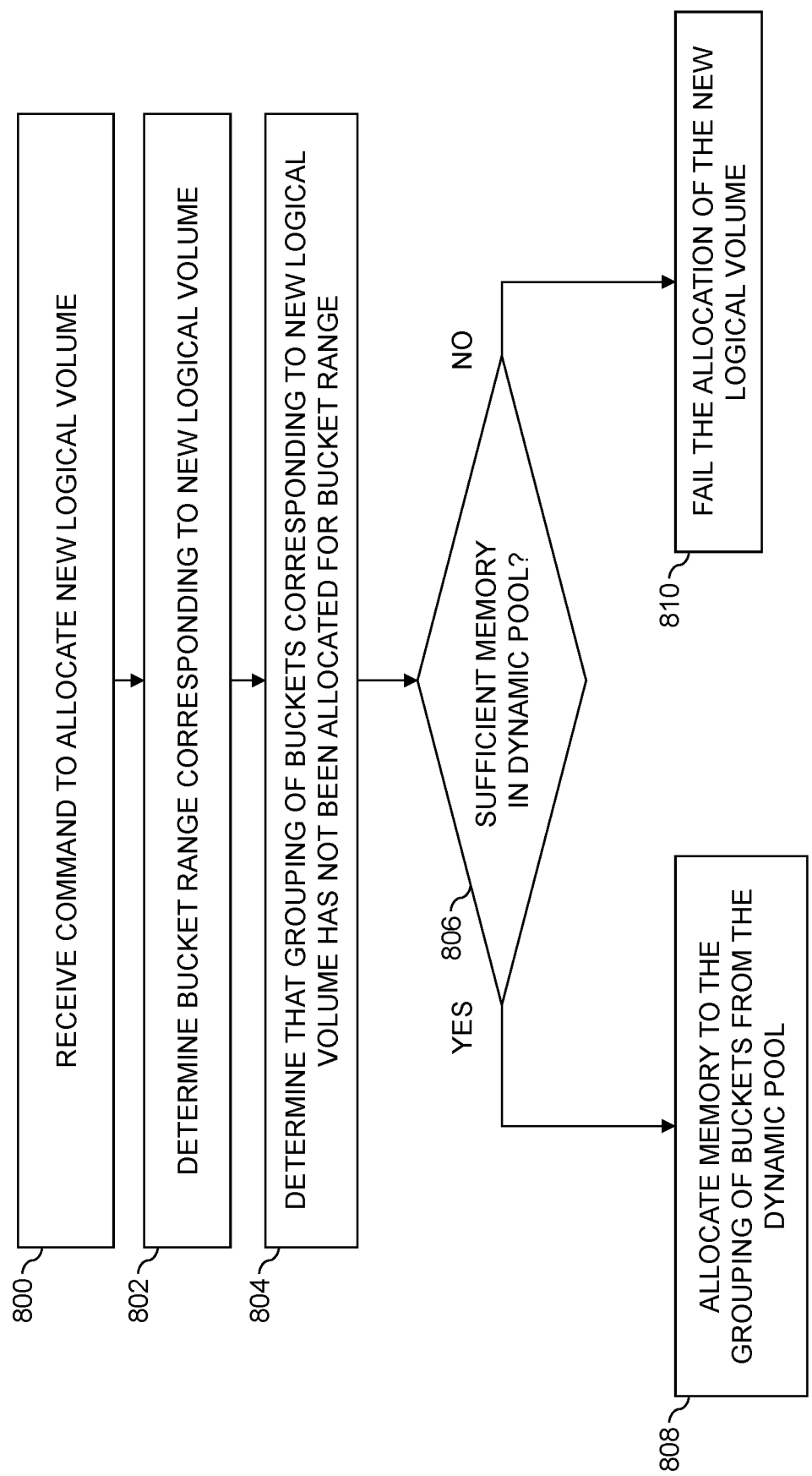
FIG. 8 is a flow diagram of an example process for allocating memory for storing metadata pages to buckets from a dynamic pool in an illustrative embodiment.
Figure 9:
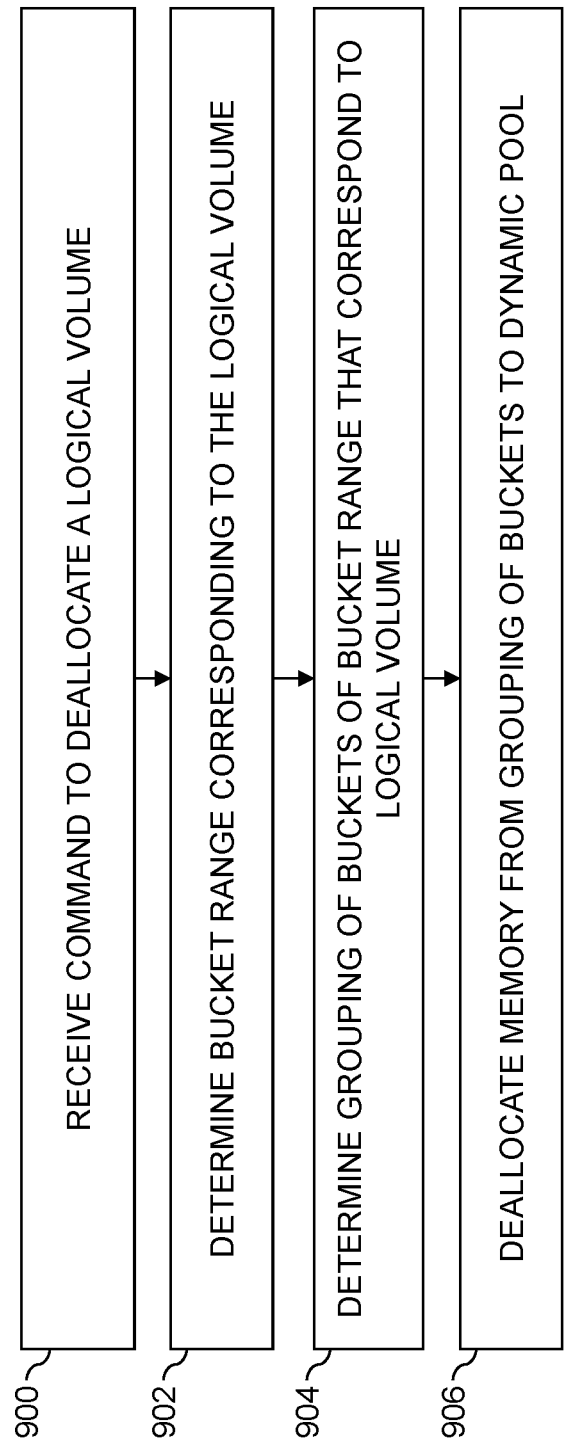
FIG. 9 is a flow diagram of an example process for deallocating memory for storing metadata pages to buckets to a dynamic pool in an illustrative embodiment.

The processes of FIGS. 7-9 may be viewed as portions of an example algorithm implemented at least in part by the storage controllers 108 of the respective storage nodes 102 of the distributed storage system of FIG. 1, utilizing metadata pages, the two-hierarchy configuration 400 of the type shown in FIGS. 4 and 5 and the bucket identifier 600 shown in FIG. 6. For example, such algorithms are illustratively carried out by one or more instances of metadata storage logic 110 in the storage controllers 108. Such algorithms can also be implemented by the distributed storage controller 208 and its processing modules 208C, 208D, 208R and 208M distributed over the storage nodes 202 of CAS system 205 of FIG. 2. These and other algorithms disclosed herein are more generally applicable to a wide variety of other distributed storage systems each comprising two or more storage nodes.

The process as illustrated in FIG. 7 illustratively includes steps 700 to 710, implementing operations for metadata storage in a distributed storage system. It is assumed that the steps of the process are performed primarily by a particular one of the storage nodes of the distributed storage system, which may illustratively correspond to one of the storage nodes 102-1 and 102-2 of FIG. 1, or any one of the storage nodes 202 of FIG. 2. The other storage nodes 102 or 202 are assumed to implement similar functionality.

At step 700, metadata storage logic 110 persistently stores a plurality of metadata pages in memory on the storage devices, e.g., according to the two-hierarchy configuration described above.

At step 702, metadata storage logic 110 obtains a bucket identifier that corresponds to a given metadata page. For example, the metadata storage logic 110 may receive a command to access the given metadata page and may obtain or retrieve the corresponding bucket identifier 600.

At step 704, metadata storage logic 110 determines a given bucket range that corresponds to the given metadata page based at least in part on a first portion of the bucket identifier, e.g., the 9 most significant bits of the volume identifier 602 in an illustrative embodiment.

At step 706, metadata storage logic 110 determines an offset into the given bucket range that corresponds to a grouping of buckets based at least in part on a second portion of the bucket identifier, e.g., a remaining 15 bits of the volume identifier 602 in an illustrative embodiment. The grouping of buckets corresponds to a given logical volume that corresponds to the given metadata page.

At step 708, metadata storage logic 110 determines an offset into the grouping of buckets that corresponds to a bucket comprising the given metadata page based at least in part on a third portion of the bucket identifier, e.g., the slice offset 604 of the bucket identifier.

At step 710, metadata storage logic 110 accesses the given metadata page based at least in part on the determined given bucket range, offset into the given bucket range and offset into the grouping of buckets.

The process as illustrated in FIG. 8 illustratively includes steps 800 to 810, implementing operations for metadata storage in a distributed storage system. It is assumed that the steps of the process are performed primarily by a particular one of the storage nodes of the distributed storage system, which may illustratively correspond to one of the storage nodes 102-1 and 102-2 of FIG. 1, or any one of the storage nodes 202 of FIG. 2. The other storage nodes 102 or 202 are assumed to implement similar functionality.

At step 800, metadata storage logic 110 receives a command to allocate a new logical volume of the storage system.

At step 802, metadata storage logic 110 determines a bucket range of the plurality of bucket ranges that corresponds to the new logical volume.

At step 804, metadata storage logic 110 determines that a grouping of buckets corresponding to the new logical volume has not been allocated for the bucket range.

At step 806, metadata storage logic 110 determines whether or not the dynamic pool 124 has sufficient memory available to allocate to the grouping of buckets. If the dynamic pool has sufficient memory, the process proceeds to step 808 and metadata storage logic 110 allocates memory to the grouping of buckets from the dynamic pool 124 for storing metadata pages corresponding to the new logical volume. If the dynamic pool does not have sufficient memory, the process proceeds to step 810 and fails the allocation of the new logical volume.

The process as illustrated in FIG. 9 illustratively includes steps 900 to 906, implementing operations for metadata storage in a distributed storage system. It is assumed that the steps of the process are performed primarily by a particular one of the storage nodes of the distributed storage system, which may illustratively correspond to one of the storage nodes 102-1 and 102-2 of FIG. 1, or any one of the storage nodes 202 of FIG. 2. The other storage nodes 102 or 202 are assumed to implement similar functionality.

At step 900, metadata storage logic 110 receives a command to deallocate a logical volume of the storage system.

At step 902, metadata storage logic 110 determines a bucket range of the plurality of bucket ranges that corresponds to the new logical volume.

At step 904, metadata storage logic 110 determines that a grouping of buckets of the bucket range corresponds to the logical volume.

At step 906, metadata storage logic 110 deallocates the memory from the grouping of buckets to the dynamic pool 124, e.g., makes the portion of the dynamic pool 124 memory that was allocated to the grouping of buckets for storing the corresponding metadata pages available for use by at least one other component of the storage system.

Similar operations may be performed on one or more additional storage nodes of the distributed storage system.

The steps are shown in sequential order for clarity and simplicity of illustration only, and certain steps can at least partially overlap with other steps.

The particular processing operations and other system functionality described in conjunction with the flow diagrams of FIGS. 7-9 are presented by way of illustrative example only, and should not be construed as limiting the scope of the disclosure in any way. Alternative embodiments can use other types of processing operations for metadata storage in a distributed storage system. For example, as indicated above, the ordering of the process steps may be varied in other embodiments, or certain steps may be performed at least in part concurrently with one another rather than serially. Also, one or more of the process steps may be repeated periodically, or multiple instances of the processes can be performed in parallel with one another in order to implement a plurality of different metadata storage processes for respective different distributed storage systems or portions thereof within a given information processing system.

Functionality such as that described in conjunction with the flow diagrams of FIGS. 7-9 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

A distributed storage controller as disclosed herein is illustratively configured to implement functionality for metadata storage, such as an algorithm comprising one or more processes of the type shown in FIGS. 7-9. Such a distributed storage controller can comprise, for example, storage controllers 108-1 and 108-2 of FIG. 1 or distributed storage controller 208 in CAS system 205, as configured to perform the steps of the processes of FIGS. 7-9.

A distributed storage controller can be implemented as part of what is more generally referred to herein as a processing platform comprising one or more processing devices each comprising a processor coupled to a memory.

A given such processing device in some embodiments may correspond to one or more virtual machines or other types of virtualization infrastructure such as Docker containers or Linux containers (LXCs). Host devices, distributed storage controllers and other system components may be implemented at least in part using processing devices of such processing platforms. For example, respective distributed modules of a distributed storage controller can be implemented in respective containers running on respective ones of the processing devices of a processing platform.

Illustrative embodiments of a distributed storage system with metadata storage functionality for persistently storing metadata on the storage devices as disclosed herein can provide a number of significant advantages relative to conventional arrangements.

For example, in some embodiments, by dynamically allocating or deallocating memory to buckets for storing metadata pages on an as needed basis in conjunction with the allocation or deallocation of the corresponding logical storage volumes, memory usage in the storage system and on the storage devices may be substantially improved, especially for storage systems that do not need a full set of buckets when the number of active and allocated logical storage volumes is relatively small. In addition, as a storage system scales up the number of allocated logical storage volumes, the memory for persistently storing metadata pages of the corresponding buckets is also scaled up in a manner that balances the memory allocation of the buckets with memory allocated for the corresponding logical storage volumes, corresponding A2H mapping table entries or other similar components of the storage system.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and distributed storage systems with metadata storage functionality will now be described in greater detail with reference to FIGS. 10 and 11. Although described in the context of system 100, these platforms may also be used to implement at least portions of other information processing systems in other embodiments.

Figure 10:
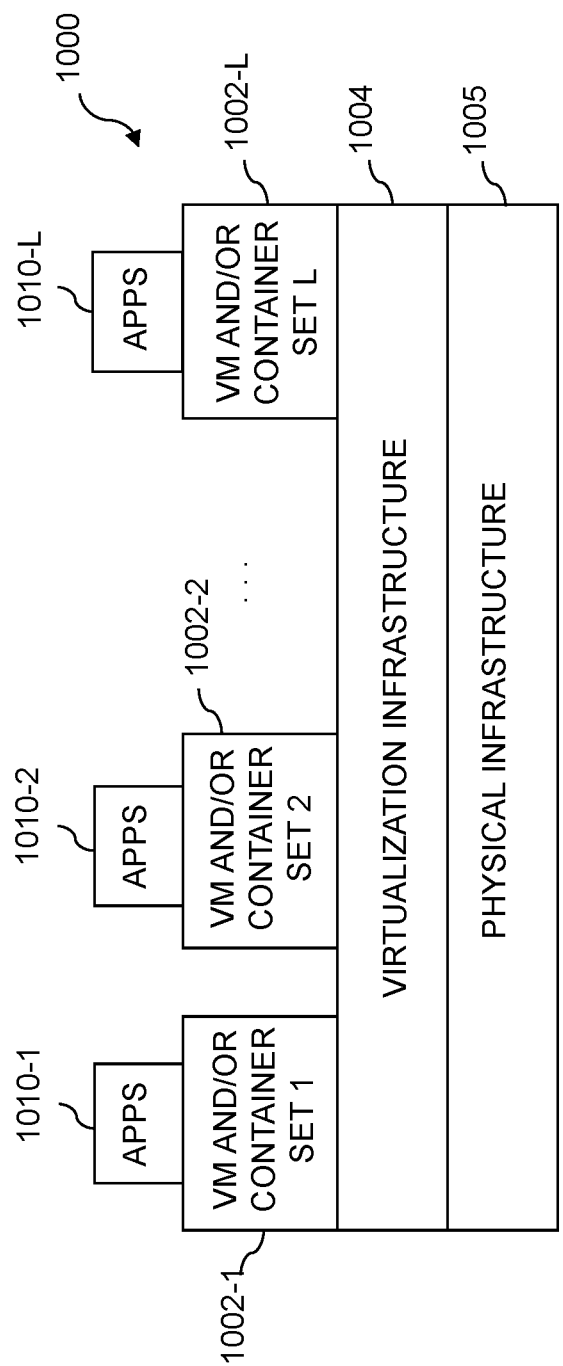
FIGS. 10 and 11 show examples of processing platforms that may be utilized to implement at least a portion of an information processing system in illustrative embodiments.
Figure 11:
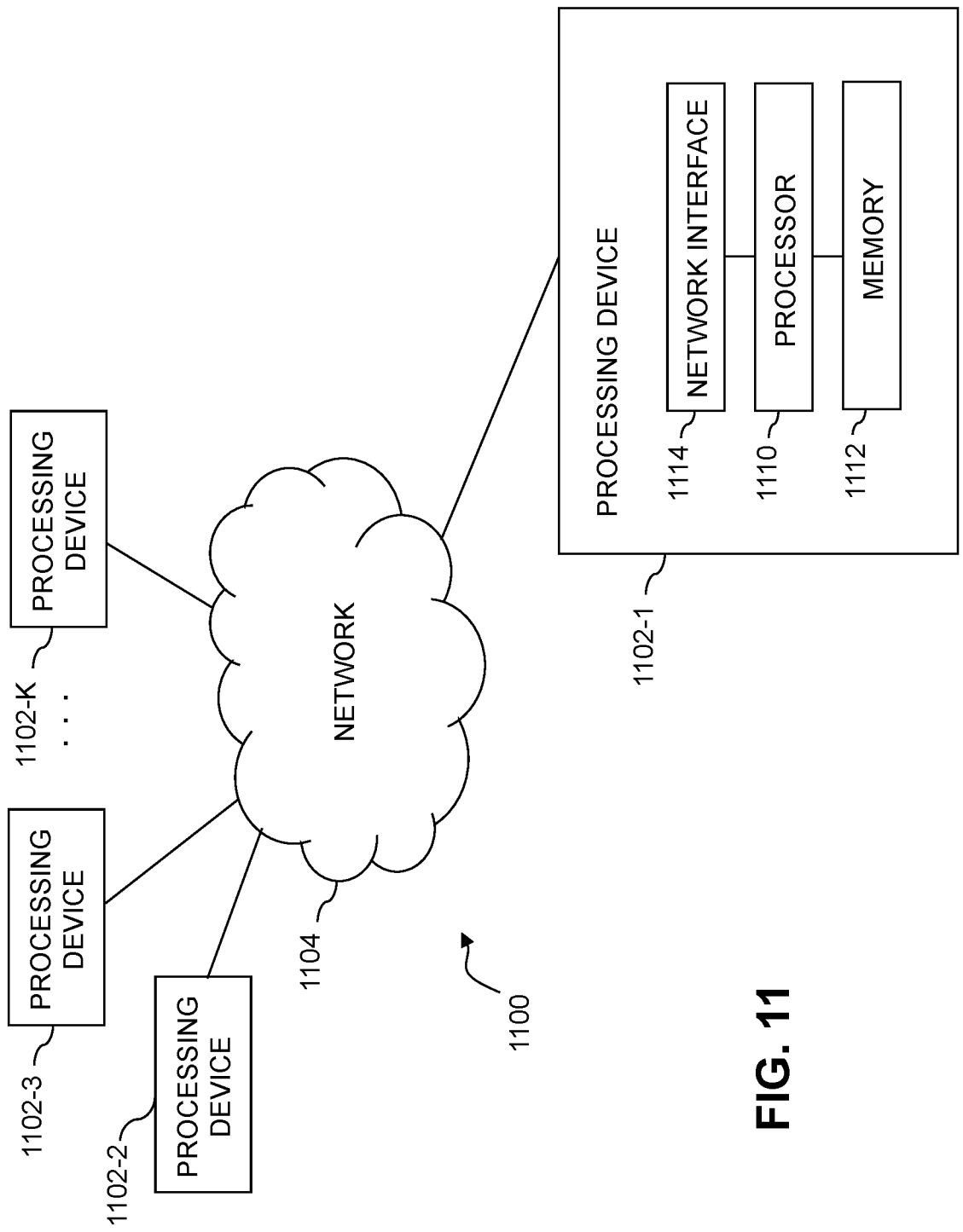

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. Such implementations can provide metadata storage functionality for persistently storing metadata pages on storage devices in a distributed storage system of the type described above using one or more processes running on a given one of the VMs. For example, each of the VMs can implement logic instances and/or other components for implementing the metadata storage functionality in the distributed storage system of FIG. 1 or the distributed CAS system 205 of FIG. 2.

A hypervisor platform may be used to implement a hypervisor within the virtualization infrastructure 1004. Such a hypervisor platform may comprise an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system. Such implementations can also provide metadata storage functionality in a distributed storage system of the type described above. For example, a container host device supporting multiple containers of one or more container sets can implement logic instances and/or other components for implementing metadata storage functionality in the distributed storage system of FIG. 1 or the distributed CAS system 205 of FIG. 2.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise a converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the metadata storage functionality provided by one or more components of a distributed storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, metadata storage logic instances and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage devices and at least one processing device comprising a processor coupled to a memory, the at least one processing device being configured:

to persistently store a plurality of metadata pages of the storage system on the plurality of storage devices, the metadata pages being organized into a plurality of buckets; and to access a given metadata page of the plurality of metadata pages based at least in part on a bucket identifier, the given metadata page corresponding to a given logical volume of a plurality of logical volumes of the storage system, the bucket identifier comprising:
- a first portion comprising an indication of a given bucket range of a plurality of bucket ranges that corresponds to the given logical volume;
- a second portion comprising an indication of an offset into the given bucket range that corresponds to a first grouping of buckets that correspond to the given logical volume; and
- a third portion comprising an indication of an offset into the first grouping of buckets that corresponds to the bucket comprising the given metadata page.

2. The apparatus of claim 1 wherein the plurality of bucket ranges comprises at least a first bucket range and one or more additional bucket ranges, and wherein the at least one processing device is further configured:
- to receive a command to allocate a first new logical volume of the storage system;
- to determine that a second bucket range of the plurality of bucket ranges corresponds to the first new logical volume;
- to determine that a second grouping of buckets corresponding to the first new logical volume has not been allocated for the second bucket range; and
- to allocate a portion of the storage devices to the second grouping of buckets for the second bucket range.

3. The apparatus of claim 2 wherein:
the at least one processing device is configured to maintain a dynamic pool of unallocated memory; and
allocating the second grouping of buckets comprises allocating a portion of the dynamic pool to the second grouping of buckets.

4. The apparatus of claim 3 wherein the at least one processing device is configured to allocate at least another portion of the dynamic pool for use by a mapping data structure entry corresponding to the first new logical volume.

5. The apparatus of claim 3 wherein the at least one processing device is further configured:
- to receive a command to allocate a second new logical volume of the storage system;
- to determine that a third bucket range of the plurality of bucket ranges corresponds to the second new logical volume;
- to determine that a third grouping of buckets corresponding to the second new logical volume has not been allocated for the third bucket range;
- to determine that the dynamic pool does not have sufficient memory available to allocate to the third grouping of buckets; and
- to fail the allocation of the second new logical volume based at least in part on the determination that the dynamic pool does not have sufficient memory available to allocate to the third grouping of buckets.

6. The apparatus of claim 3 wherein the at least one processing device is further configured:
- to receive a command to deallocate the first new logical volume;
- to determine that the second bucket range of the plurality of bucket ranges corresponds to the first new logical volume;
- to determine that the second grouping of buckets of the second bucket range corresponds to the first new logical volume; and
- to deallocate the second grouping of buckets, the deallocating comprising making the portion of the dynamic pool that was allocated to the second grouping of buckets available for use by at least one other component of the storage system.

7. The apparatus of claim 1 wherein:
the first portion of the bucket identifier and the second portion of the bucket identifier collectively comprise a volume identifier of the storage system that corresponds to the given metadata page; and
the volume identifier comprises a plurality of bytes, the first portion of the bucket identifier corresponds to a designated number of bits of the plurality of bytes of the volume identifier and the second portion of the bucket identifier corresponds to the remaining bits of the plurality of bytes of the volume identifier.

8. A method comprising:
persistently storing a plurality of metadata pages of a storage system on a plurality of storage devices of the storage system, the metadata pages being organized into a plurality of buckets; and
accessing a given metadata page of the plurality of metadata pages based at least in part on a bucket identifier, the given metadata page corresponding to a given logical volume of a plurality of logical volumes of the storage system, the bucket identifier comprising:
- a first portion comprising an indication of a given bucket range of a plurality of bucket ranges that corresponds to the given logical volume;
- a second portion comprising an indication of an offset into the given bucket range that corresponds to a first grouping of buckets that correspond to the given logical volume; and
- a third portion comprising an indication of an offset into the first grouping of buckets that corresponds to the bucket comprising the given metadata page;

wherein the method is performed by at least one processing device of the storage system, the at least one processing device comprising a processor coupled to a memory.

9. The method of claim 8 wherein the plurality of bucket ranges comprises at least a first bucket range and one or more additional bucket ranges, and wherein the method further comprises:
receiving a command to allocate a first new logical volume of the storage system;
determining that a second bucket range of the plurality of bucket ranges corresponds to the first new logical volume;
determining that a second grouping of buckets corresponding to the first new logical volume has not been allocated for the second bucket range; and
allocating a portion of the storage devices to the second grouping of buckets for the second bucket range.

10. The method of claim 9 wherein:
the method further comprises maintaining a dynamic pool of unallocated memory; and
allocating the second grouping of buckets comprises allocating a portion of the dynamic pool to the second grouping of buckets.

11. The method of claim 10 wherein the method further comprises allocating at least another portion of the dynamic pool for use by a mapping data structure entry corresponding to the first new logical volume.

12. The method of claim 10 wherein the method further comprises:
receiving a command to allocate a second new logical volume of the storage system;
determining that a third bucket range of the plurality of bucket ranges corresponds to the second new logical volume;
determining that a third grouping of buckets corresponding to the second new logical volume has not been allocated for the third bucket range;
determining that the dynamic pool does not have sufficient memory available to allocate to the third grouping of buckets; and
failing the allocation of the second new logical volume based at least in part on the determination that the dynamic pool does not have sufficient memory available to allocate to the third grouping of buckets.

13. The method of claim 10 wherein the method further comprises:
receiving a command to deallocate the first new logical volume;
determining that the second bucket range of the plurality of bucket ranges corresponds to the first new logical volume;
determining that the second grouping of buckets of the second bucket range corresponds to the first new logical volume; and
deallocating the second grouping of buckets, the deallocating comprising making the portion of the dynamic pool that was allocated to the second grouping of buckets available for use by at least one other component of the storage system.

14. The method of claim 8 wherein:
the first portion of the bucket identifier and the second portion of the bucket identifier collectively comprise a volume identifier of the storage system that corresponds to the given metadata page; and
the volume identifier comprises a plurality of bytes, the first portion of the bucket identifier corresponds to a designated number of bits of the plurality of bytes of the volume identifier and the second portion of the bucket identifier corresponds to the remaining bits of the plurality of bytes of the volume identifier.

15. A computer program product comprising a non-transitory processor-readable storage medium having stored therein program code of one or more software programs, wherein the program code when executed by at least one processing device of a storage system, the storage system comprising a plurality of storage devices and the at least one processing device comprising a processor coupled to a memory, causes the at least one processing device:
to persistently store a plurality of metadata pages of the storage system on the plurality of storage devices, the metadata pages being organized into a plurality of buckets; and
to access a given metadata page of the plurality of metadata pages based at least in part on a bucket identifier, the given metadata page corresponding to a given logical volume of a plurality of logical volumes of the storage system, the bucket identifier comprising:
a first portion comprising an indication of a given bucket range of a plurality of bucket ranges that corresponds to the given logical volume;
a second portion comprising an indication of an offset into the given bucket range that corresponds to a first grouping of buckets that correspond to the given logical volume; and
a third portion comprising an indication of an offset into the first grouping of buckets that corresponds to the bucket comprising the given metadata page.

16. The computer program product of claim 15 wherein the plurality of bucket ranges comprises at least a first bucket range and one or more additional bucket ranges, and wherein the program code causes the at least one processing device:
to receive a command to allocate a first new logical volume of the storage system;
to determine that a second bucket range of the plurality of bucket ranges corresponds to the first new logical volume;
to determine that a second grouping of buckets corresponding to the first new logical volume has not been allocated for the second bucket range; and
to allocate a portion of the storage devices to the second grouping of buckets for the second bucket range.

17. The computer program product of claim 16 wherein:
wherein the program code causes the at least one processing device to maintain a dynamic pool of unallocated memory; and
allocating the second grouping of buckets comprises allocating a portion of the dynamic pool to the second grouping of buckets.

18. The computer program product of claim 17 wherein the program code causes the at least one processing device to allocate at least another portion of the dynamic pool for use by a mapping data structure entry corresponding to the first new logical volume.

19. The computer program product of claim 17 wherein the program code causes the at least one processing device:
to receive a command to allocate a second new logical volume of the storage system;
to determine that a third bucket range of the plurality of bucket ranges corresponds to the second new logical volume;
to determine that a third grouping of buckets corresponding to the second new logical volume has not been allocated for the third bucket range;
to determine that the dynamic pool does not have sufficient memory available to allocate to the third grouping of buckets; and
to fail the allocation of the second new logical volume based at least in part on the determination that the dynamic pool does not have sufficient memory available to allocate to the third grouping of buckets.

20. The computer program product of claim 17 wherein the program code causes the at least one processing device:
to receive a command to deallocate the first new logical volume;
to determine that the second bucket range of the plurality of bucket ranges corresponds to the first new logical volume;
to determine that the second grouping of buckets of the second bucket range corresponds to the first new logical volume; and
to deallocate the second grouping of buckets, the deallocating comprising making the portion of the dynamic pool that was allocated to the second grouping of buckets available for use by at least one other component of the storage system.

* * * * *